ELECTRICALLY OPERATING SELECTING SYSTEMS

Filed May 7, 1951 10 Sheets-Sheet 1

Inventors,
Thomas H. Flowers,
Samuel D. Harper,
Lionel R. F. Harris,
by Hall & Houghton
Attorneys.

Dec. 13, 1955 T. H. FLOWERS ET AL 2,727,094

ELECTRICALLY OPERATING SELECTING SYSTEMS

Filed May 7, 1951 10 Sheets-Sheet 2

Inventors,
Thomas H. Flowers,
Samuel D. Harper,
Lionel R. F. Harris,
by Hall & Houghton
Attorneys

ELECTRICALLY OPERATING SELECTING SYSTEMS

Inventors,
Thomas H. Flowers,
Samuel D Harper,
Lionel R.F. Harris,
by Hall & Houghton,
Attorneys.

ELECTRICALLY OPERATING SELECTING SYSTEMS

Filed May 7, 1951 10 Sheets-Sheet 4

Inventors,
Thomas H. Flowers,
Samuel D. Harper,
Lionel R.F. Harris,
by Hall + Houghton
Attorneys.

ELECTRICALLY OPERATING SELECTING SYSTEMS

Filed May 7, 1951 10 Sheets-Sheet 5

Inventors
Thomas H. Flowers,
Samuel D. Harper,
Lionel R. F. Harris,
by Hall & Houghton
Attorneys.

Dec. 13, 1955 T. H. FLOWERS ET AL 2,727,094

ELECTRICALLY OPERATING SELECTING SYSTEMS

Filed May 7, 1951 10 Sheets-Sheet 6

Inventors,
Thomas H. Flowers,
Samuel D. Harper,
Lionel R.F. Harris,
by Hall & Houghton
Attorneys.

ELECTRICALLY OPERATING SELECTING SYSTEMS

Filed May 7, 1951

10 Sheets-Sheet 7

Inventors,
Thomas H. Flowers,
Samuel D. Harper,
Lionel R.F. Harris,
by Hall & Houghton
Attorneys.

*Inventors,*
*Thomas H. Flowers,*
*Samuel D. Harper,*
*Lionel R.F. Harris,*
*by Hall & Houghton*
*Attorneys.*

ELECTRICALLY OPERATING SELECTING SYSTEMS

Inventors,
Thomas H. Flowers,
Samuel D. Harper,
Lionel R F Harris,
by Hall & Houghton
Attorneys

ELECTRICALLY OPERATING SELECTING SYSTEMS

Filed May 7, 1951 10 Sheets-Sheet 10

Inventors
Thomas H. Flowers,
Samuel D. Harper,
Lionel R. F. Harris,
By Hall + Houghton, Att'y's.

United States Patent Office 2,727,094

Patented Dec. 13, 1955

2,727,094

ELECTRICALLY OPERATING SELECTING SYSTEMS

Thomas Harold Flowers, Mill Hill, Middlesex, Samuel Denis Harper, Prestbury, Cheltenham, Gloucestershire, and Lionel Roy Frank Harris, London, England, assignors to Her Majesty's Postmaster General, London, England Application May 7, 1951, Serial No. 224,374

Claims priority, application Great Britain May 17, 1950

25 Claims. (Cl. 179—18)

Figure 1:
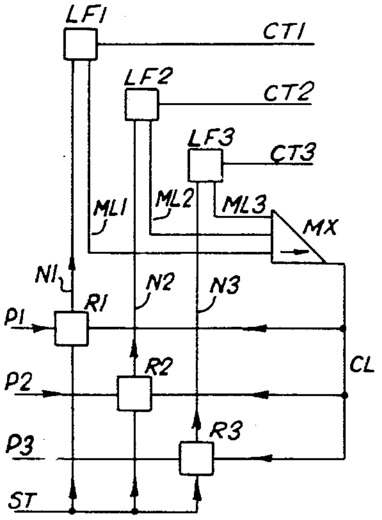

This invention relates to electrically operating selecting systems and particularly, although not exclusively, to automatic telephone exchange selecting systems in which in the operation of the system, a selection has to be made automatically of a circuit, switch or the like from among a plurality of circuits, switches or the like all equally suited to some desired operation or function in the system. To facilitate an appreciation of the broader aspects of the invention and an understanding of exemplary embodiments thereof, the present specification is subdivided into sections under the following headings, here tabulated to constitute an index to the specification:

INDEX

I. Prologue and Definitions
II. Drawings
III. General Description
IV. Exemplary Embodiment
  A. Multiplex side circuit arrangements (Fig. 10)
  B. Connector side circuit arrangements (Fig. 11)
  C. Slave selectors (Fig. 12)
  D. Master selector (Fig. 14)
  E. Master Selector Control Circuits (Figs. 13–14)
    1. Operation in selector action
    2. Generation of secretary pulse
    3. Application of secretary pulse
    4. Release of master selector
    5. Operation in line finder action
    6. Slave marker (Fig. 15)
  F. Exemplary overall operation
V. Epilogue and claims Following this order of presentation:

I. PROLOGUE AND DEFINITIONS

The invention will be described with reference to its application to automatic telephone exchanges. In the operation of said exchanges, a calling subscriber's line, junction or other line external to the exchange is connected to another subscriber's line, junction or other line over, or through the agency (according to the type of exchange) of line-finders, selectors, register-translators and other units of apparatus interconnected by trunks within the exchange, and provision has to be made for many such connections to be set up and maintained simultaneously. The connection of a line or trunk over a switch to another line or trunk involves the indication to the switch of the lines or trunks to be connected and the indication varies according to the characteristics of the switches in use. Crossbar switches, for example, need current in one horizontal and one vertical magnet to indicate a connection to be made over a switch. The problem of selection has several aspects. In one aspect, lines and trunks, collectively referred to as circuits, are provided in groups, and in the course of the establishment of any one connection, selection of a free circuit in a designated group of circuits has to be made at each switching stage in the connection and the selected circuit indicated to the switch which makes the connection. The group may be designated by the number dialled or other known means but the means of designation does not form part of the present invention. The free circuits in the designated group may be marked as free for selection by well-known means. The lines of a subscriber having more than one line form a P. B. X group. The line of a subscriber having only one line may be regarded for the purpose of description as a group of one line. Groups of one circuit are not excluded from the present invention. A number of groups of circuits as so far defined may be assembled into a larger group for connection to a unit switch or may be re-grouped into a number of further groups each connected to a unit switch. In any arrangement however, the circuits from among which a selection has to be made have to be marked and provided that a group of circuits is understood to be the circuits connected to a unit switch, this aspect of selection may be concisely stated as the selection and indication of one out of a number of marked circuits in a group of circuits.

In a further aspect of selection, in a first group of circuits having access through switches to a second group of circuits for the purpose of establishing connections through the exchange, the circuits in the first group call for connection through the switches to circuits in the second group and when a circuit calls for a connection it is necessary both to select and indicate a free switch and to select and indicate to the said selected switch the selected calling circuit. Two or more circuits in the first group may call substantially simultaneously and it may then be necessary to select the calling circuits one at a time for connection through the switches. The calling circuits indicate or mark themselves by a calling signal. The selection of free switches is accomplished by an apparatus to which the switches are connected over circuits over which each switch is marked when free so that the selection comprises the selection of a free circuit.

Selection and connection by switches in automatic exchanges in its most general form comprises a group of circuits, a number of which are marked as suitable for connection, the selection of one of the marked circuits and the indication of the selected circuit.

Time-spaced trains of pulses are used in selecting means operating in accordance with the present invention and it is convenient to define what is meant by time-spaced trains of pulses. Thus, a pulse is a brief change of current in a circuit, and a train of pulses is a train of rhythmically occurring pulses. A plurality of trains of pulses are said to be time-spaced when the pulses of the trains of pulses occur at different times, that is, no pulse of any one train of pulses overlaps in time a pulse of another train of pulses. Time-spaced trains of pulses are commonly timed so that the pulses of each train of pulses occur in cyclic order with equal time spacing between the successively occurring pulses. Means for generating time-spaced pulses are described in the specifications of co-pending U. S. Patent applications Ser. No. 55,619, filed October 26, 1948 and Ser. No. 191,584, filed October 23, 1950.

In this specification the term register is used to denote a bi-stable apparatus which has two stable states of equilibrium, one of which is the normal or unoperated state and the other the operated state. The term includes Eccles-Jordan trigger circuits, gas-discharge tubes and flip-flop circuits as defined in definition 65.06.086 of American Standards Association Communications 42. A register is operated on the occurrence of a set of circuit conditions which are particular to that register and the register remains operated to register that its particular set of conditions has occurred.

An automatic telephone exchange is a switch built up of smaller switches, each of which has two groups of circuits connected to it and when suitably controlled will connect as many as required of the circuits in one group each to a circuit in the other group. Each group of circuits may be subscribers' lines, junctions and so forth or trunks between switches. It is common practice for each of the circuits in one of the groups to be terminated on apparatus which when suitably controlled connects that circuit to a selected one of the circuits in the other group. In this specification the term "connector" is used to designate said apparatus.

According to the present invention, apparatus for selecting one of a number of circuits marked out of a group of circuits comprises means for generating a time spaced train of marking pulses for each of the circuits in the said group of circuits, at least one set of registers, the registers of each set being arranged in at least one group, the number of combinations of one register operated in each group being at least equal to the number of circuits in the said group of circuits, means for indicating a different circuit in said group of circuits by each combination of one register operated in each group of registers of each said set of registers, means for marking a free set of registers, means for applying the trains of pulses of the said circuits marked out of said group of circuits to means responsive to one of the marking pulses applied to it to operate in the said marked set of registers, the combination of one register in each said group of registers indicating the circuit the train of marking pulses for which includes the said one of the marking pulses.

Apparatus for selecting one of a number of circuits marked out of a group of circuits further comprises, according to the invention, means for generating a time-spaced train of pulses for each of the circuits in the said group of circuits, a master set and at least one slave set of registers, the registers of each master and slave set being arranged in at least one group, the number of combinations of one register operated in each group being at least equal to the number of circuits in the said group of circuits, means for indicating a different circuit in said group of circuits by each combination of one register operated in each group of registers of each said slave set of registers, means for marking a free slave set of registers, means for applying to the said master set of register the train of pulses of the said circuits marked out of said group of circuits, means for operating a combination of one registering means in each said group of register in the said master set of registers by a pulse of said train of pulses applied to said master set of registers, and means for operating registers in the said marked slave set of registers means corresponding to the said operated register means in said master set of registers.

The invention further comprises means to prevent the operation of further registers in a set of registers after the operation of one register in a group of registers has been initiated or completed.

II. DRAWINGS

Figure 8:
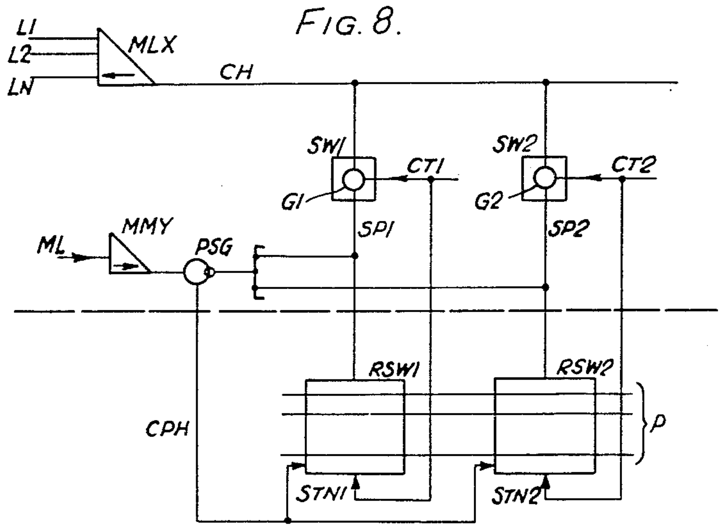
Figure 9:
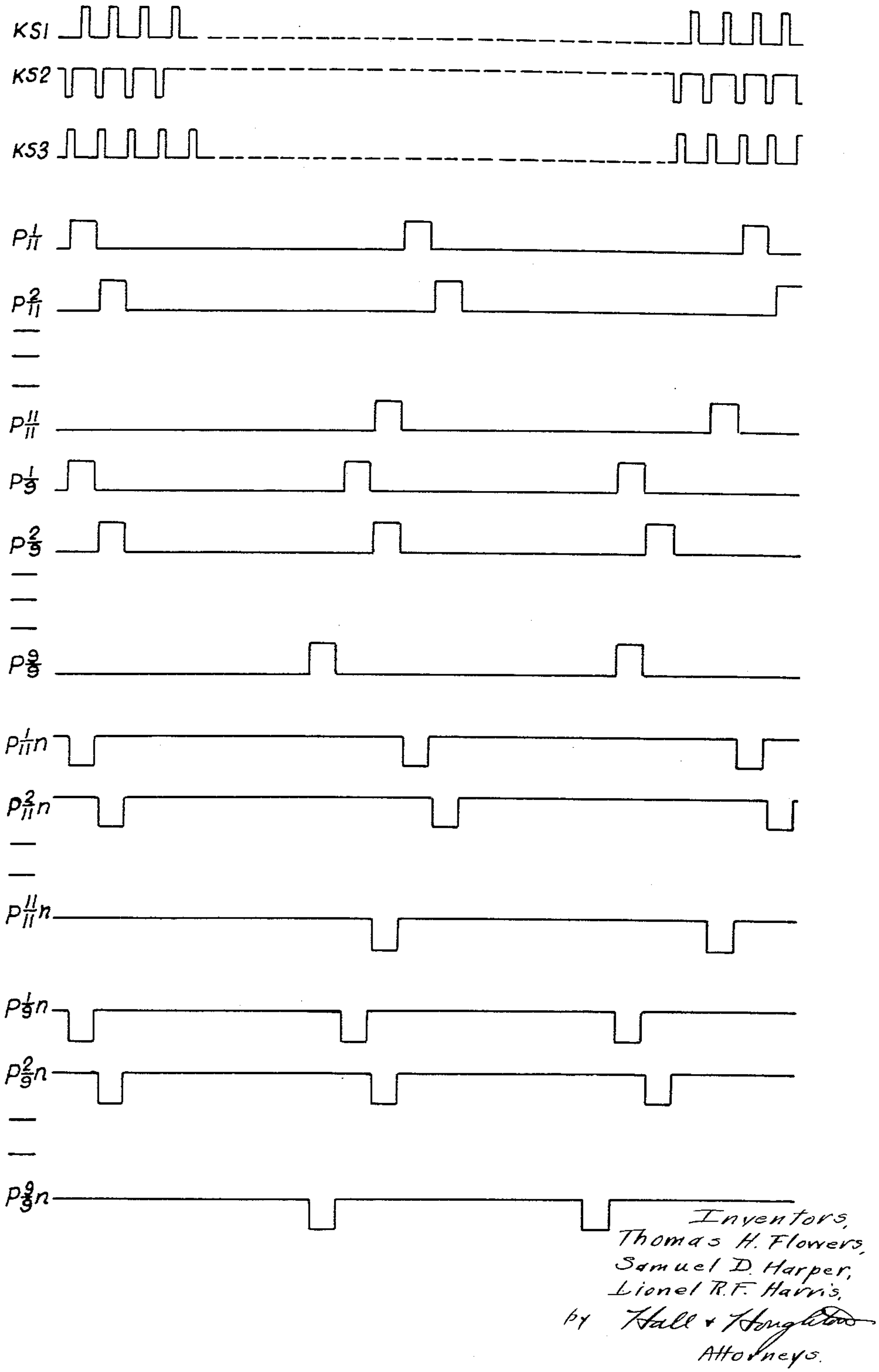
Figure 14:
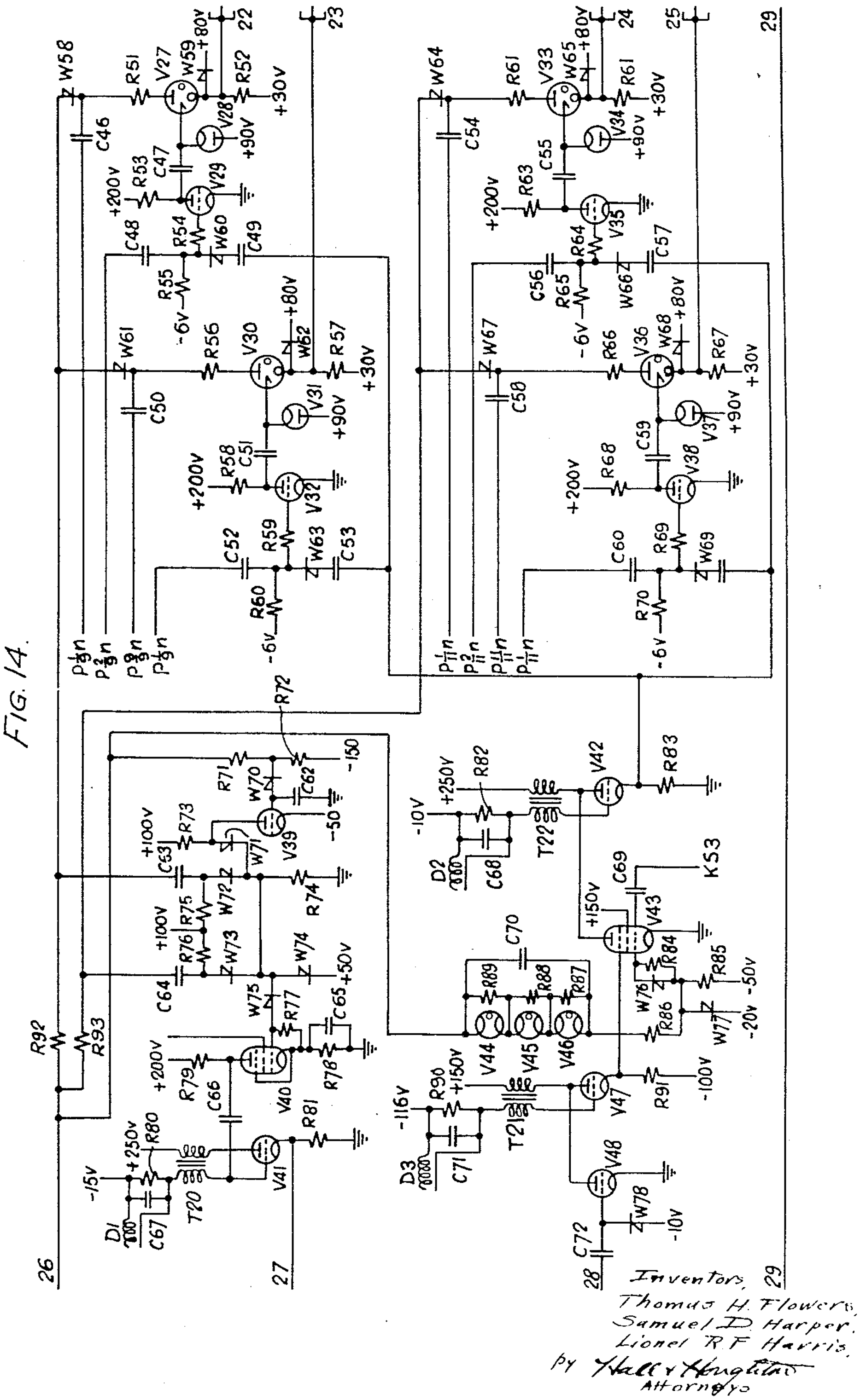
Figures 15, 16:
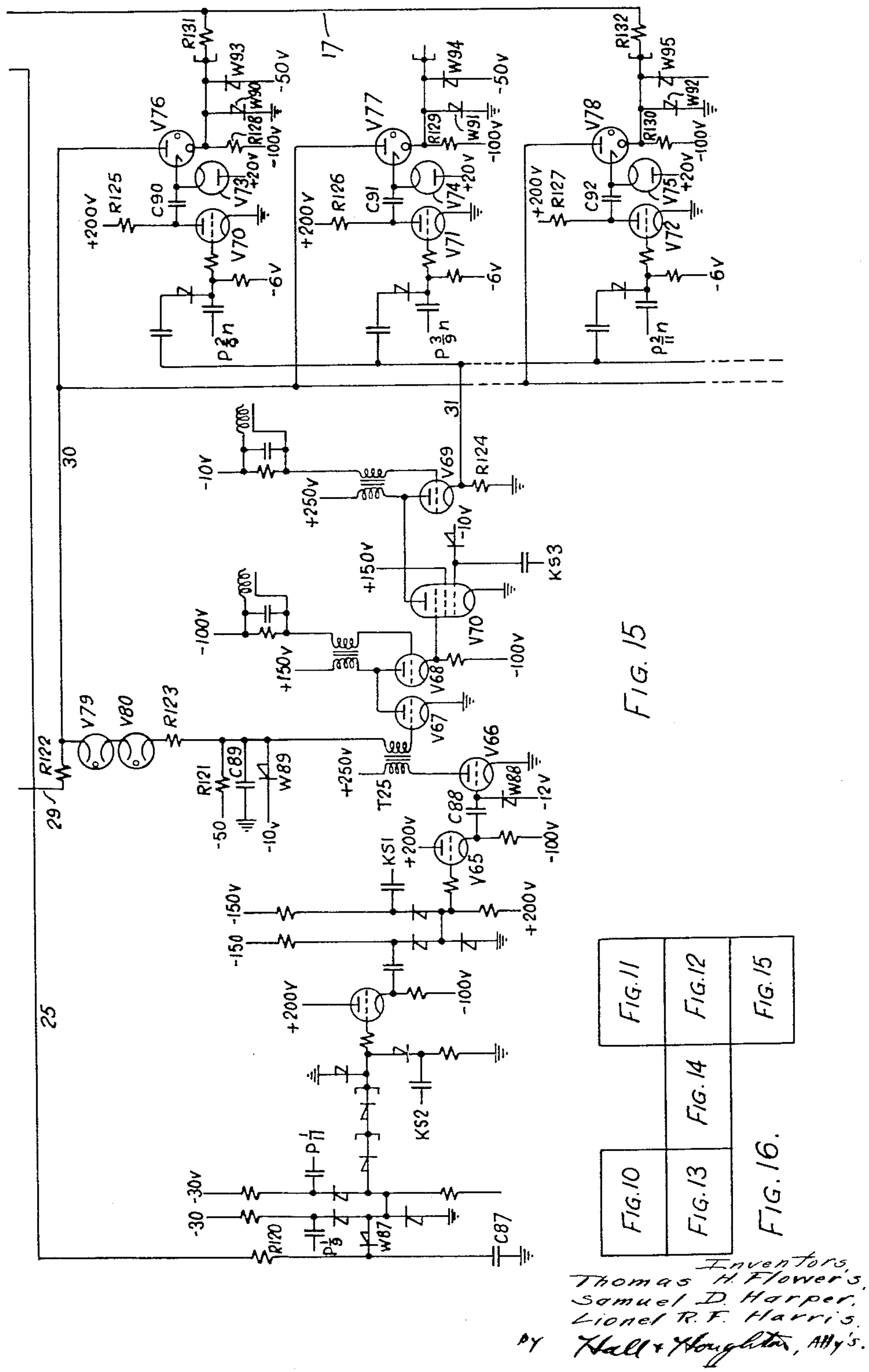

In order that the invention may be more fully described, systems arranged to operate in accordance therewith will now be described in greater detail with reference to Figs. 1 to 8 of the accompanying drawings which illustrate such systems diagrammatically, and Figures 10 to 15 which when assembled as shown in Fig. 16 show the circuits of a particular application of the invention to a telephone switching system, Fig. 9 showing pulses suitable for operating the circuits of Figs. 10 to 15.

III. GENERAL DESCRIPTION

Referring to Fig. 1, a group of circuits CT, of which three CT1, CT2 and CT3 are shown, are connected to line-finders LF1, LF2 and LF3 respectively in a telephone switching system. The line-finders have connected to them, but not shown in the figure, a group of incoming circuits any one or more of which may call for connection to a free circuit CT1, CT2 or CT3 over the associated line-finder. When any incoming circuit calls for a connection to one of the circuits CT, a signal is given in known manner over a common lead ST, and it is then required to select a free circuit and line-finder to connect to the calling incoming circuit. Marking leads ML of which three, ML1, ML2, ML3, are shown connect the line-finders to a generator of time-spaced trains of marking pulses MX and over each lead is marked i. e. signalled whether the circuit CT1, CT2 or CT3 and the line-finder to which it is connected is free or already engaged on a connection. The pulse generator MX generates a time-spaced train of marking pulses for each marking lead which marks the free condition of its line-finder, and applies all the pulses generated over the common lead CL to the registers R1, R2 and R3. Registers R1, R2 and R3 comprise a set of registers in one group. Each register is connected to a line-finder over one of a number of leads N of which N1, N2 and N3 are shown and when operated indicates by a signal over the lead that the line-finder and circuit CT to which it is connected is selected to make connection to the calling line. Each register has supplied to it a train of registering pulses *p*, the references *p*1, *p*2 and *p*3 being applied to the connecting leads to the registers, the pulses of the train of pulses coinciding with the pulses of the train of marking pulses generated by the generator MX when the marking lead ML of the line-finder to which the register is also connected marks the free condition of the line-finder. Normally therefore in the absence of a calling incoming circuit, each register associated with a free line-finder will receive pulses over lead CL coinciding with the pulses of its pulse source *p*. When an incoming circuit calls, a signal is given over lead ST as already described, and is communicated to each register R, thus marking the set of registers. A register will operate and remain operated if it receives simultaneously a signal over lead ST, a pulse from the generator of its pulse *p*, and a pulse over lead CL. Because of the time spacing of the marking pulses generated by pulse generator MX, no two registers can operate simultaneously. The registers are arranged to operate by means not shown, so that when one is operated no second register can operate. Hence in response to the signal over lead ST, a free circuit and line-finder, if there is a free circuit and line-finder, is selected and marked to connect the circuit through the line-finder to a calling line. The time-spaced pulse generator MX may be, for example, a multiplex modulator of the type disclosed in the specification copending of patent application Serial No. 191,584. The registers R may be for example, three electrode gas-discharge tubes with the signal over lead ST, and pulses *p* and CL communicated to the strikers so that each tube will fire when a signal over lead ST, and a pulse of its pulse train *p* and CL simultaneously exist. A tube when fired can prevent, for example, by a resistor common to all the cathodes, any other tube from firing. The signal from a register over its lead N to indicate the selected line-finder and circuit may be a D. C. signal or any other convenient signal.

When a free line-finder has been selected and has responded to the indicating signal over its lead N that it is selected, it is necessary to release the operated registers so that a further selection may be made. The means of releasing the operated registers are not shown in the figure but may comprise an apparatus associated with each line-finder, the said apparatus emitting a release signal to the set of registers when the line-finder is marked over its N lead but signalled as busy over its marking lead ML. A line-finder marked over its N lead will normally find a calling line and thus be signalled busy and bring about the release of the registers. Exceptionally, in the event of a fault for example, the marked line-finder will not be marked busy. It may therefore be desirable to release the registers a fixed time after operation, the time being longer than necessary for normal operation. In the event of timed release, a further selection will take place if the signal over lead ST is still in existence, and there is then a high probability that a different line-finder will be selected.

Fig. 1 shows a group of three circuits CT for the purpose of illustration. Clearly the group may comprise any number of circuits for which time-spaced trains of pulses may be generated. Fig. 1 also shows only a single group of registers equal in number to the number of circuits CT. When the number of circuits is large, it may be undesirable to provide an equal number of registers. An economy in registers can be made by using more than one group of registers, the combinations of one register operated in each group being at least equal to the number of circuits instead of the number of registers being equal to the number of circuits as illustrated in Fig. 2.

Figure 2:
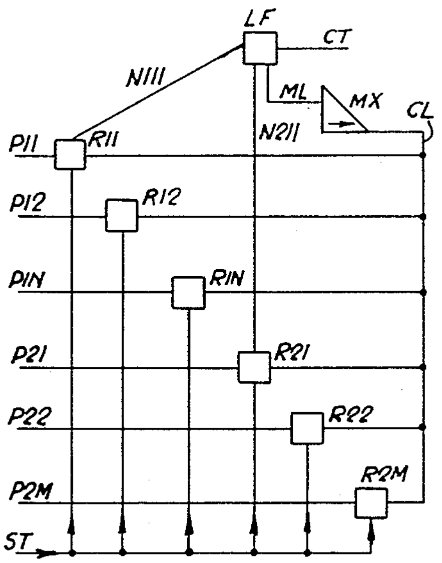

In Fig. 2 a group of line-finders, circuits and marker leads are represented by one line-finder LF, circuit CT and marking lead ML connected to the time-spaced pulse generator MX. Any one of the line-finders and circuits which is free will signal the free condition over its lead ML and cause the pulse generator MX to generate a time-spaced train of marking pulses, all the pulses being emitted over a common lead CL. In this example two groups of registers are provided and each register is connected to the common lead CL and to a registering pulse supply. One group comprises the registers R11, R12 . . . $R_{1N}$ connected respectively to a registering pulse supply $p11$, $p12$ . . . $p_{1N}$. The second group comprises the registers R21, R22 . . . $R_{2M}$ connected respectively to a registering pulse supply $p21$, $p22$ . . . $p_{2M}$.

The number of groups of registers and the numbers of registers in each group are chosen so that the number of combinations of one register in each group is at least equal to the number of line-finders and circuits in the group of line-finders and circuits. The trains of registering pulses applied to the registers and their time-spacing are arranged so that for each train of marking pulses which the generator MX may generate, the pulses of the train of marking pulses coincide in time with a pulse from one pulse supply in each of the groups of pulses. This may conveniently be arranged by using for the pulse generator MX a multiplex pulse modulator of the types disclosed in the specifications of co-pending U. S. patent applications Ser. No. 191,584, filed October 23, 1950 and 212,736, filed February 26, 1951, Patent No. 2,632,880, issued March 24, 1953, the modulator being fed from the same $p$ pulse sources as are connected to the registers. An arrangement of this kind is described later in this specification with reference to Figs. 9 to 15. Each register is arranged to be operated and thereafter to remain operated by the coincidence of a signal over a lead ST connected to all the registers, a pulse over lead CL and a pulse from its $p$ pulse source. Hence in response to a signal over lead ST, if there is a free line-finder and circuit CT producing a marking pulse over the common lead CL, one register in each group of registers is operated. It is arranged that when a register is operated no other register in the same group can operate. Each register is connected over leads, for example, N111 and N211, to a number of line-finders, each of which is connected to one register in each group of registers and in such order that each line-finder is connected to a different combination of one register in each group of registers. A line-finder is marked as selected to connect its circuit through to a calling line when all the registers to which it is connected are operated.

Figure 3:
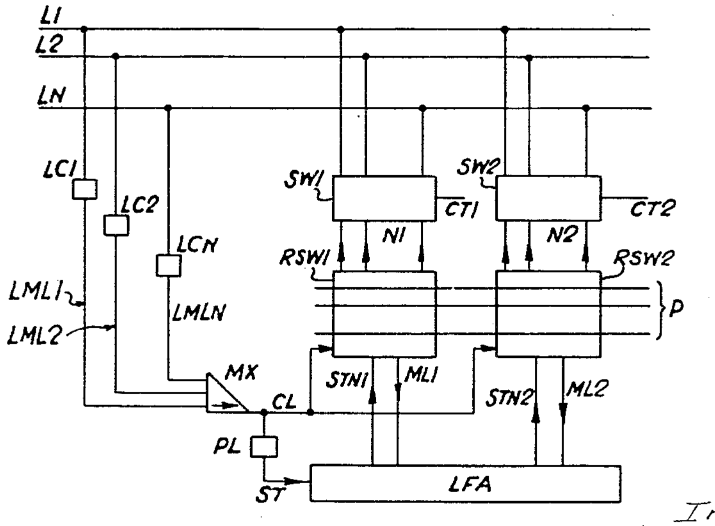

Referring to Fig. 3, L1, L2 . . . $L_N$ represent a group of telephone lines; each telephone line may consist of a number of wires but is shown diagrammatically as a single lead. The lines are connected in multiple to a number of connector switches, of which two SW1 and SW2 are shown in the figure. Each switch has connected to it a circuit CT and forms part of a line-finder, the sets of registers RSW, of which RSW1 and RSW2 are represented forming another part. The lines L signal by a calling signal when connection through a line-finder is required. The connector switch of a selected line-finder is required to make a connection between a calling line, or if more than one calling line exists, of one of the calling lines, to the circuit CT connected to the line-finder. Each switch SW and its associated set of registers RSW are connected over a group or groups of leads N, of which N1 and N2 are represented, each lead connecting a register with a controlling element in the switch. The number of groups of registers in a set, and the numbers of registers in the groups is chosen so that the number of combinations of one register operated in each group of registers is at least equal to the number of lines in the group of lines L1, L2 . . . $L_N$. Each connector switch SW is constructed so that each of said combinations signalled over the leads N causes a particular line to be connected to the circuit CT. Switches of the type described are known and referred to more particularly later in this specification.

Each line L is connected to an apparatus LC of which examples LC1, LC2 and LCN are represented, which emits over one of a number of marking leads LML of which LML1, LML2 and $LML_N$ are shown, a signal when the line is calling for a connection through a line-finder, but is not so connected. The marking leads LML are connected to a generator of time-spaced trains of pulses MX which generates and applies over the common lead CL a train of pulses for each calling circuit as described with reference to Figs. 1 and 2 for the generation of time-spaced trains of pulses for the free line-finders. The common lead CL is connected to all the sets of registers RSW, which are connected to a set of registering pulses $p$ also as previously described. Each set of registers signals over a marking lead ML to a line-finder selector LFA the condition free or engaged of the set of registers. The line-finder selector LFA is connected to each set of registers over a lead STN (STN1, STN2, etc.) and in response to a signal over the lead ST marks the STN lead of a free set of registers.

The apparatus LFA may comprise for example apparatus according to Fig. 1 or 2. As shown in Fig. 3, the lead ST is connected via a pulse lengthener PL to the common lead CL. A pulse over the lead CL is lengthened by PL into a continuous signal which when applied to lead ST causes LFA to select and mark over its lead STN a free line-finder as previously described.

In operation, when one of the lines L calls, the marking lead LML of the calling line is marked and a time-spaced train of pulses appears over lead CL. The train of pulses over lead CL is lengthened by pulse lengthener PL to a continuous signal applied over lead ST to the line-finder selector LFA which selects and marks over its lead STN a free set of registers RSW. Registers in the set of registers RSW marked over its lead STN, operate to one of the pulses over lead CL, and indicate to the connector switch SW by the combination of leads N which are marked which calling line to connect to the circuit CT. If more than one line L calls simultaneously, the marked set of registers RSW will select one of the lines, another set of registers will then be marked over its lead STN and select another calling line and so on. The registers in any one set are released when the line and circuit connected through the switch SW are released.

Figure 4:
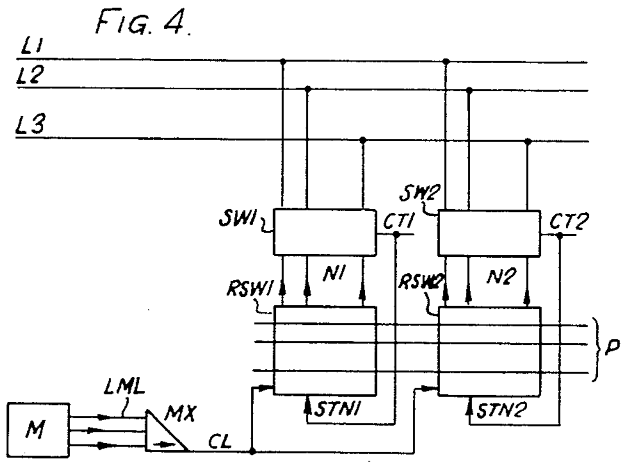

Fig. 4 shows an arrangement similar in many respects to that of Fig. 3 and in which the similar parts have the same designations as in Fig. 3. It is suitable however for the operation that a circuit CT has to be connected to a free line from amongst a number of lines out of the group of lines L. Lines which are suitable for connection to the circuit CT are marked by a marker M, over marking leads LML of which there is one for each circuit L. Suitable lines are free lines in a designated group of lines and the marker M may be the type of marker well known in crossbar switching systems and adapted as will be readily apparent to those skilled in the art to mark the free lines in a designated group of lines. In this arrangement the set of registers is marked over its lead STN from a signal transmitted over the circuit CT, shown schematically in Fig. 4 by a connection between each circuit CT and its marking lead STN. In operation, the marker M marks the leads LML of the lines L suitable for connection, the train of pulses corresponding to the marked leads are transmitted over the common lead CL to all the sets of registers, the circuit to which a line L is to be connected marks its set of registers over its STN lead and a register in each group in the marked set of registers operates to one of the pulses over the lead CL, thus selecting one of the marked lines L for connection. The operated registers mark their leads N and thus control the switch SW to connect the circuit CT to the selected line L and are released when the line and circuit are released.

The telephone connector switches which are shown schematically and marked SW in Figs. 3 and 4, preferably have the capacity to switch a large number, for example 100, lines L to a circuit CT. The number of registers in a set of registers may therefore be of the order of twenty, for example, two groups each of ten registers. Each register has to have associated with it a gate circuit which responds to the simultaneous existence of a marking signal over the lead STN, a pulse over lead CL and a pulse over a *p* pulse lead, and because the gate circuits and registers are operated by pulses they have to be relatively quick acting and may therefore be expensive to provide compared with slower acting devices, although cheaper and slower acting devices might be adequate to control the switches.

According to a feature of the invention not shown in the diagram, the registers may be relatively slow-operating devices, for example, gas-discharge tubes, provided that impulse lengtheners are interposed between the gate circuits and the registers and that means are also provided to render inoperative any further pulse over lead CL which follows an operative pulse within a time interval at least equal to the operating time of the registers. These means may comprise, for example, a blocking oscillator or pulse trigger circuit interposed between the lead CL and the sets of registers, and the pulse lengtheners may comprise for example capacitors charged through rectifiers.

An economy may be achieved by providing one master set of registers connected in multiple to a plurality of slave sets of registers, operated registers in the master set of registers operating corresponding registers in a marked set of slave registers. This is explained in more detail with reference to Fig. 5.

Figure 5:
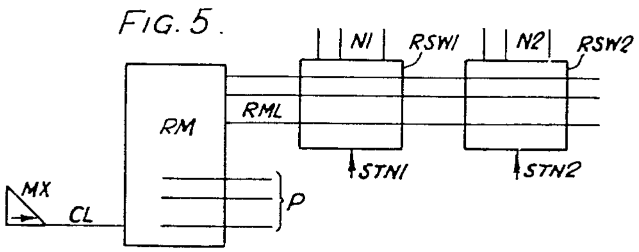

In Fig. 5, MX is a generator of time-spaced trains of pulses corresponding to the similar generators MX in the previous figures. CL is a common lead over which the pulses generated by the generator MX are communicated to a master set of registers RM. To the master set of registers is connected the *p* pulse supplies corresponding to the *p* pulse supplies of Figs. 3 and 4. Each register in the master set operates when a registering pulse from the *p* pulse source connected to it coincides with a marking pulse over the common lead CL, one register in each group of registers being operated and the operation of further registers prevented as described previously. It is not essential for the master set of registers to be controlled by a marking lead ST or STN of the previous figures. A register in the master set when operated, marks one of the leads of a group of leads RML connected to all the slave sets of registers RSW (RSW1, RSW2 etc). This mark may be a D. C. signal. Each lead RML is connected to a register in each slave set of registers. A slave set of registers is marked over its lead STN in any of the ways previously described and registers in that slave and connected to marked leads RML then operate and mark leads N to the switch SW as previously described. Because the gate circuits and registers of the slaves are not operated by timed pulses they may be less complicated and expensive than those of the master. It is necessary to release the operated registers in the master set of registers so that a further selection may be made when required.

If the apparatus of Fig. 5 is applied as a modification to Fig. 3, the master set of registers will mark over the leads RML a circuit which is marking the pulse generator MX. When a slave set of registers responds to the marking, a line-finder should connect to the marked calling circuit and remove the marking signal from MX. By a suitable combination of the markings over leads RML and the marking leads to the generator MX, the master set of registers may be made to release when a marked calling circuit has been picked up by a line-finder, or by a timed release, as described in connection with Fig. 1. If the apparatus of Fig. 5 is applied as a modification to Fig. 4, the master set of registers may be released when the marking pulses over lead CL cease.

Figure 6:
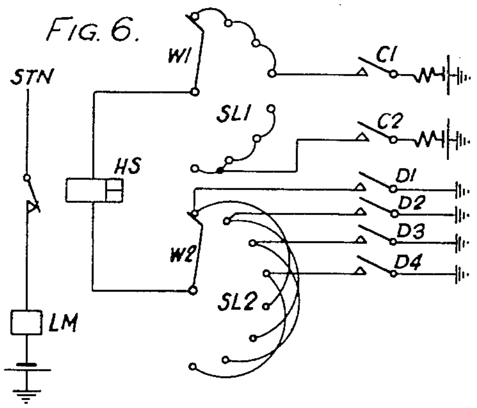

In Figs. 3 and 4, switches SW are described as being controlled to connect a circuit CT to a line L when one lead in each group of leads in the set of leads N is marked. If the switch SW is a mechanical switch of known type, for example the so called motor switch, having a set of wipers rotating over a bank of contacts, markings of the type described are a well-known means of positioning the wipers on a particular contact. In Fig. 6 which represents a switch having eight contacts in the bank, as an example, two levels SL (SL1, SL2) of contacts are each traversed by a wiper W (W1, W2). The contacts of level SL1 are commoned in two groups of four contacts each and connected through a relay contact C (C1, C2) and a resistor to the exchange battery. The contacts of level SL2 are commoned in four groups of two contacts, each group being connected via a relay contact D (D1, D2, D3, D4) to earth. The two wipers are connected together via a relay HS. The break contact of the relay HS is connected on one side to a start lead STN and to the other side to a latch magnet in series with a battery.

In operation, one contact in each group of contacts C and D is operated, a start signal is applied to the lead STN, the latch magnet LM operates and in known manner causes the wipers to rotate. When current flows through relay HS the rotation of the wipers is arrested and the wipers can be arrested on any selected contact according to the combination of one group of contacts marked in each of the groups of contacts in the levels SL1 and SL2.

The specifications of co-pending patent application Serial No. 56,619 discloses a connector switch which comprises time-spaced pulse generators to provide connections between a group of circuits on one side of the switch and circuits on the other side of the switch. The present invention is readily applied to the control of switches of this type as will now be described with reference to Figs. 7 and 8.

Figure 7:
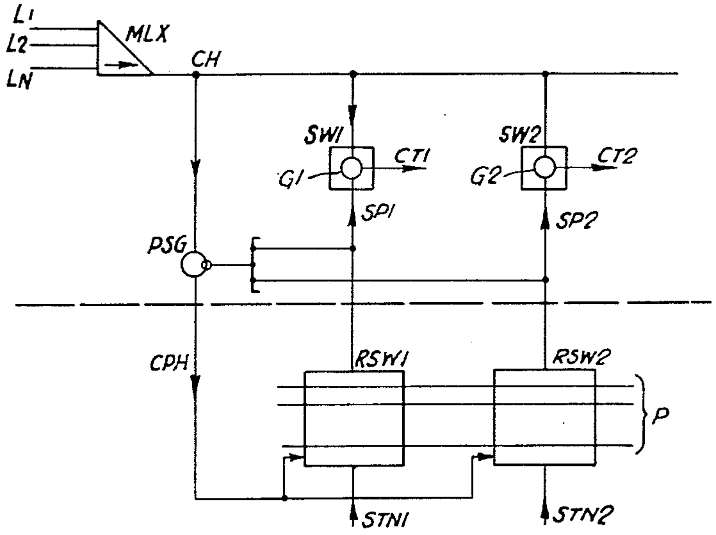

Referring first to Fig. 7, a line-finder connector switch described in the specification referred to is schematically represented by the part of the figure above the dashed line. L1, L2 . . . LN are lines connected to a generator and modulator of time-spaced trains of pulses MLX. Each line receives calling and clearing signals and speech signals from apparatus not shown. The modulator MLX provides over a common signal circuit CH a time-spaced channel train of pulses for each line which is receiving a calling signal, and the speech over the line modulates the channel pulses. Switches SW1, SW2 . . . are connected to the common signal circuit and each comprises a gate circuit G (G1, G2) which, when operated by a pulse which will be termed a selecting pulse over a lead SP (SP1, SP2) connects the common circuit CH to a selector circuit CT (CT1, CT2), which comprises means not shown for demodulating and amplifying a modulated pulse. A selector circuit CT is thus connected to any line L when there is connected to the lead SP a train of selecting pulses coinciding with the train of channel pulses produced by the modulator MLX in response to the calling signal over the line L. A pulse suppression gate circuit PSG is connected to the common signal circuit CH and to the SP leads via de-coupling means, not shown, of all the switches SW. The action of the gate circuit PSG is that the circuit CH is connected to a circuit CPH if no pulse is present on any SP lead but is disconnected for the duration of any pulse transmitted over any SP lead. Hence the train of channel pulses of any line L which is calling but is not connected to a circuit CT appears over lead CPH. These pulses may be applied directly to the sets of registers RSW, to which are also applied registering pulses $p$ in groups and having the same time relationship with the pulses generated by the modulator MLX as described for Fig. 2 for the pulses $p$ in that figure had in relation to the pulses generated by the generator MX. A mark on a lead STN to a set of registers will cause the registers in that set to respond as previously described. The operated registers in this case gate trains of pulses, the $p$ pulses for example, which are combined into a single train of pulses are applied over lead SP as required by the selector. Alternatively, one master set of registers may operate to the pulses over the lead CPH and control the operation of registers in a marked slave set of registers which will produce a required selecting train of pulses over its lead SP. Release of the master set of registers is advantageously caused by comparing a train of pulses generated by the operated registers in the master set of registers with the trains of pulses over the lead CPH. When the master set of registers first responds to the marking pulses, it generates a train of pulses synchronous with one of the trains of marking pulses, over the lead CPH. When a slave set of registers has responded to the master set markings, the marking train of pulses coinciding with the train of pulses generated by the master set of registers disappears from the circuit CPH and this may be made to release the master set of registers.

Fig. 8 shows a selector connector switch in which calling circuits CT (CT1, CT2) are connected through gate circuits G (G1, G2) to a common signal circuit CH connected to a multiplex modulator MLX which distributes time-spaced trains of pulses on the circuit CH to the lines L1, L2 . . . LN. The gate circuits G are operated by selecting pulses over leads SP which are connected as in Fig. 7 to a pulse suppression gate circuit PSG also as in Fig. 7. The gate circuit PSG is connected, however, not to the channel CH, but to the output of a marker multiplex MMY. The marker multiplex has connected to it a marker lead ML for each line L connected to the multiplex MLX and in response to a marker signal on any one lead ML provides over the output circuit a train of pulses coincident with the train of channel pulses through multiplex MLX of the line L corresponding to the selected lead ML. The group of lines from which a free one is to be selected for connection to a calling circuit CT may be indicated over the marker leads ML by means described in the specifications of co-pending patent applications Serial Nos. 56,619 and 177,411. The train of pulses of any line already connected to a circuit CT is suppressed at the pulse suppression gate PSG. The lines L which may be connected are thus indicated by the trains of pulses which are communicated over the circuit CPH to the sets of registers RSW. The set of registers required to respond to one of the pulses is marked over its lead STN by the calling signal over the circuit CT shown schematically as connected to the lead STN. The generation of the selecting pulses over the lead SP and the alternative of master and slave sets of registers is similar to that described in connection with Fig. 7.

IV. *Exemplary embodiment*

Figures 9, 10, 11, 12, 13, 14 and 15 show by way of example and in greater detail, one form that may be taken by the apparatus already described in outline.

Fig. 9 shows the time distribution of the various pulse trains used in this embodiment of the invention. The pulse train designated KS1 is of one microsecond pulse repetition time, the pulses of which are positive going, substantially rectangular and of duration 0.2 microsecond. The pulse train designated KS2 is of one microsecond pulse repetition time, the pulses of which are negative going, substantially rectangular and of duration 0.2 microsecond. The KS2 pulses occur approximately 0.5 microsecond after the KS1 pulses. The pulse train designated KS3 is of one microsecond pulse repetition time, the pulses of which are positive going, substantially rectangular and of duration 0.2 microsecond. The KS3 pulses occur approximately 0.6 microsecond after the KS1 pulses. These pulse trains KS1, KS2 and KS3 may be produced using means well known to those skilled in the art, comprising for example a one megacycle per second oscillator, limiting amplifiers, differentiating circuits and the like.

Four other groups of pulse trains are used. In one group there are 11 pulse trains, three of which, designated $P1/11$, $P2/11$ and $P11/11$ are shown in the diagram. These pulse trains each have a pulse repetition time of 11 microseconds and the pulses of all the pulse trains in the group are equally spaced in time and are positive going. Thus pulses of pulse train $P1/11$ occur one microsecond before the pulses of pulse train $P2/11$; the pulses of $P2/11$ occur one microsecond before the pulses of $P3/11$; etc. In the other group there are 9 pulse trains, three of which, designated $P1/9$, $P2/9$ and $P9/9$, are shown in Fig. 9. These pulse trains each have a pulse repetition time of 9 microseconds and the pulses of all the pulse trains in the group are equally spaced in time and are positive going. Thus pulses of pulse train $P1/9$ occur one microsecond before the pulses of pulse train $P2/9$; the pulses of $P2/9$ occur one microsecond before the pulses of $P3/9$; etc. In both these groups every pulse is substantially rectangular and of duration 0.8 microsecond and is centered on a KS1 pulse.

Fig. 9 also shows negative going versions of the above two groups of pulses which are used in the applications to be described. These are designated by the suffix $n$. Thus the negative going version of $P1/11$ is referred to as $P1/11n$ etc.

A group of pulses occurring every 9 microseconds is herein referred to as a 9-phase group of pulses and any one of the pulse trains of the group is referred to as a 9-phase pulse train. Similarly the pulses occurring every 11 microseconds are referred to as being 11-phase pulses or 11-phase pulse trains of an 11-phase group.

It is assumed that all the aforementioned pulses are available in a low impedance of, for example, 75 or 150 ohms and are of suitable amplitude, for example, 20 volts. The 9-phase and the 11-phase pulses may be derived using, for example, pulse frequency dividing means described in co-pending patent application Serial No. 212,736 and pulse amplifiers etc., well known to those skilled in the art.

Figure 10:
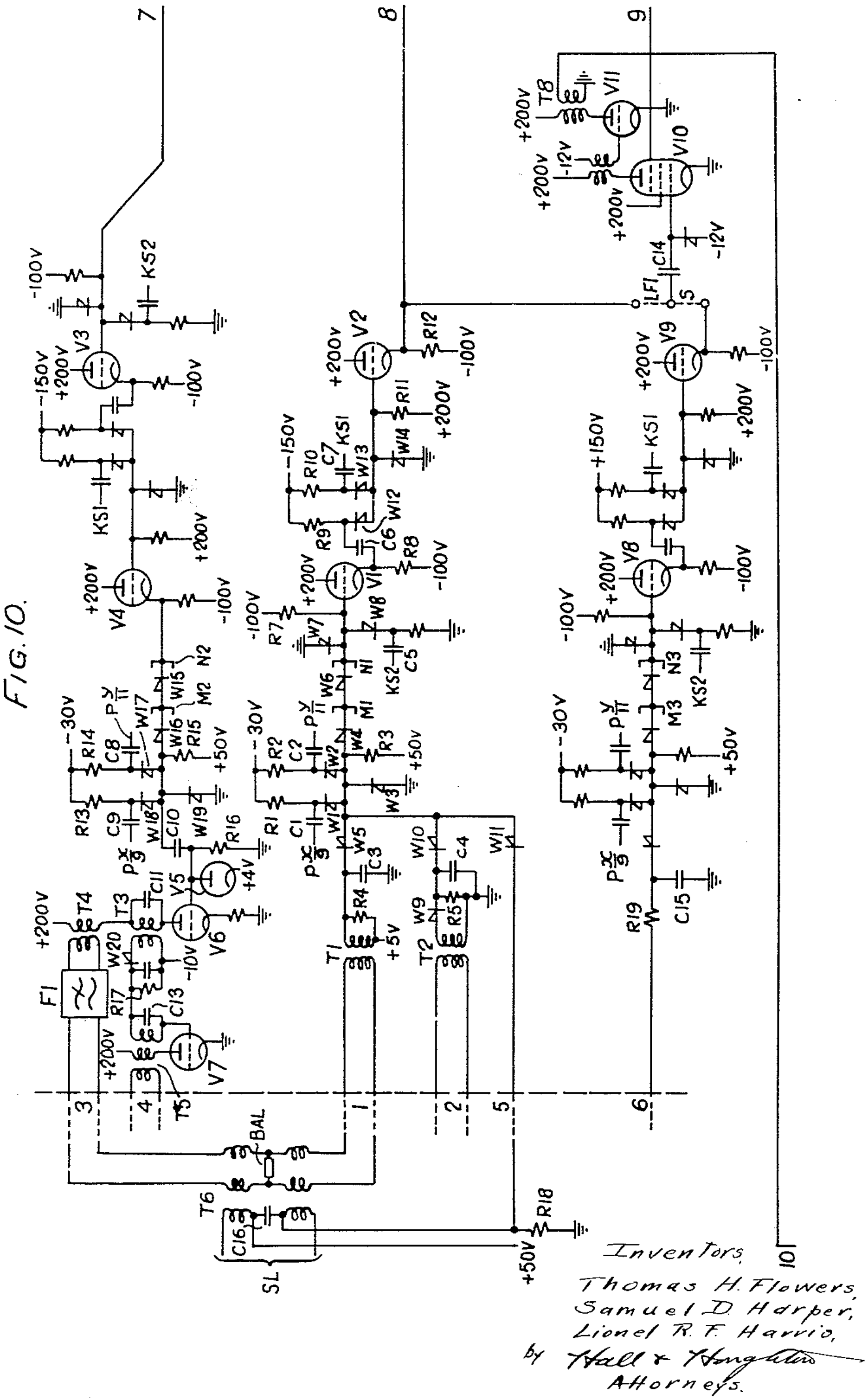
Figure 11:
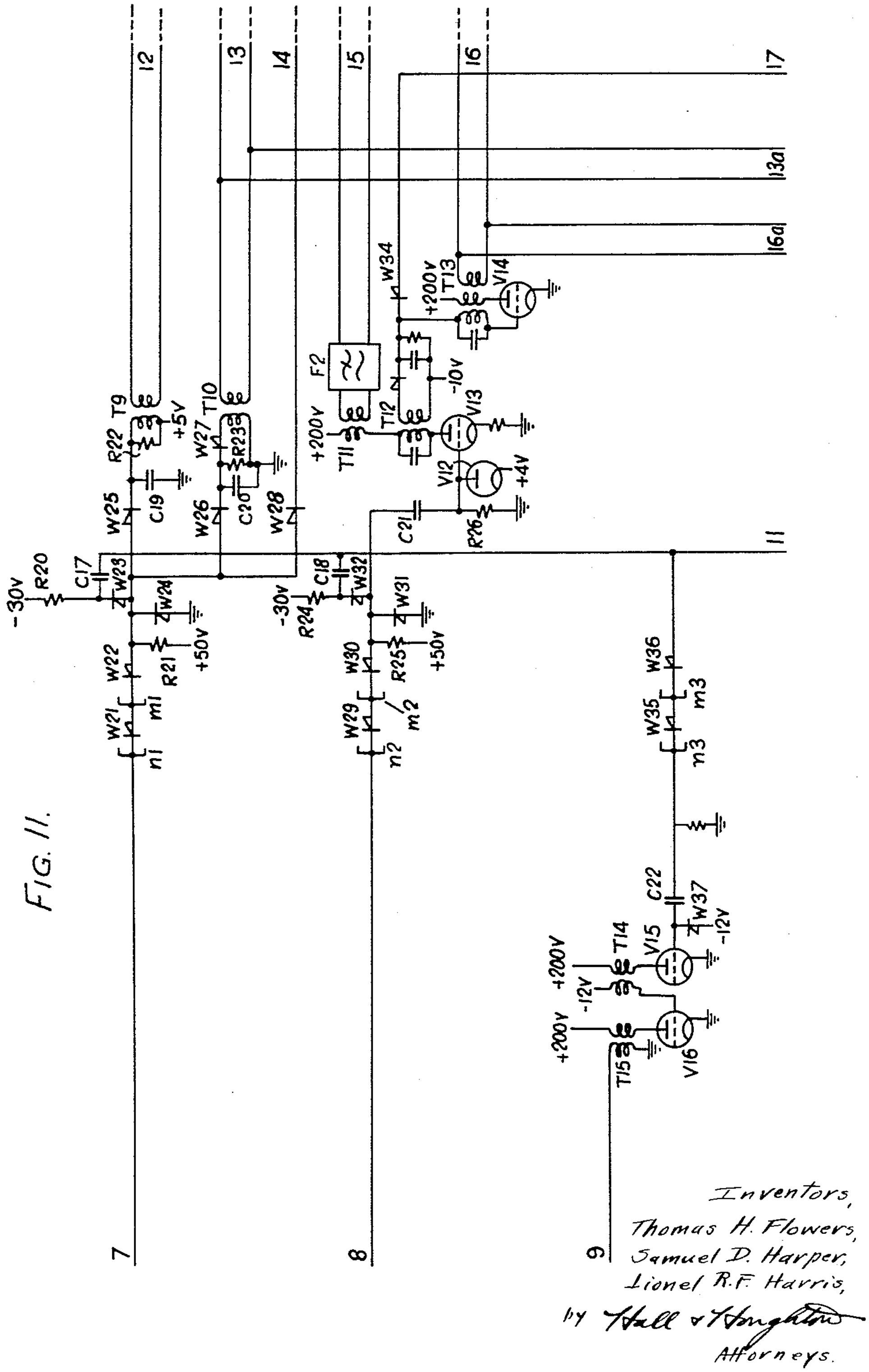

Figures 10 and 11 show the apparatus used to transmit speech and hold signals through a time-division multiplex switch and the means for marking the circuits on the multiplex side of the switch; Figure 10 shows the apparatus associated with circuits on the multiplex side of the switch and Figure 11 shows a connector switch associated with circuits on the connector side of the switch.

(A) *Multiplex side circuit arrangements (Fig. 10)*

In Figure 10 apparatus to the right of the vertical dashed line, and to the left of commoning points M1, M2 and M3 is associated with each circuit connected to the multiplex side of the switch, apparatus that lies between points M and N is common to a number of such circuits and apparatus that lies to the right of points N1, N2 and N3 is common to the switch. Each of the circuits connected to the multiplex side of the switch uses an individual train of channel pulses for the transmission of speech and hold signals through the switch and the pulses of a channel pulse-train are produced on the coincidence of the pulses of two pulse-trains, selected one from the 9-phase group of pulses and the other from the 11-phase group of pulses. In Figure 10 the circuit illustrated uses the two pulses $P^x/_9$ and $P^y/_{11}$ to generate its channel pulses. There are 99 combinations of $x$ from 1 to 9 with $y$ from 1 to 11, so that 99 circuits may be connected to the multiplex.

Speech signals into the switch are applied over pair circuit 1 to transformer T1 and the potential difference between the plates of capacitor C3 follow the voltage of the applied speech signals. A hold signal is applied either as a 10 kc./s. signal on pair circuit 2 or as a unidirectional signal on lead 5 according to the usage of the switch in the exchange systems. As shown in Fig. 10, a D. C. hold signal is applied over lead 5 from a subscriber's line circuit including resistor R18. When a hold signal is applied over lead 5, the A. C. hold circuit transformer T2, rectifiers W9 and W10, resistor R5 and capacity C4 are omitted. In other usage of the switch, for example when the circuits 1, 2, 3 and 4 are connected over a trunk to circuits of another switch, an A. C. hold signal is applied over circuit 2 and lead 5 and rectifier W11 are omitted. When a hold signal of either kind is applied the junction between rectifiers W1, W2 and W3 may rise to a potential of some 8 volts above earth potential.

In the absence of a hold signal and a pulse on either of the leads connected to capacitors C1 and C2 each of the two equal currents flowing through resistors R1 and R2 is arranged to exceed the current flowing through resistor R3; a current, equal to the difference between the sum of the currents through resistors R1 and R2 and the current through resistor R3 flows through rectifier W3 in its conducting direction. The potential of the junction between rectifiers W1, W2 and W3 is then slightly below earth potential. Each positive going pulse from pulse source $P^x/_9$ (or pulse source $P^y/_{11}$) biases rectifier W1 (or rectifier W2) to its high resistance state so cutting off the current through the rectifier W1 (or rectifier W2); the current through resistor R2 (or resistor R1) exceeds the current through resistor R3 so that a current still flows through rectifier W3 in its conducting direction and the potential of the junction between rectifiers W1, W2 and W3 is still slightly below earth potential. When one of the pulses $P^x/_9$ coincides with one of the pulses $P^y/_{11}$ both rectifiers W1 and W2 are biased to their high resistance states and current ceases to flow through the two rectifiers; in the absence of a hold signal the current from the +50 V. supply flows via resistor R3 and rectifiers W10 or W11 to charge the capacitance of capacitor C4 or through the load impedance that connects lead 5 to earth and the potential of the junction between the rectifiers W1, W2 and W3 does not rise appreciably above earth potential.

When a hold signal is applied to pair circuit 2 or to lead 5, capacitor C4 is charged so that the potential of its upper plate is at least 8 volts above earth potential or the potential left hand terminal of rectifier W11 is at least 8 volts above earth potential; then, when the pulses of pulses $P^x/_9$ and pulses $P^y/_{11}$ coincide the current from the +50 V. supply flows through resistor R3 and rectifiers W4 and W6 to charge the self-capacitances of the leads between the junction of rectifiers W1, W2 and W3 and the grid of valve V1.

In the absence of speech signals on pair circuit 1 the potential of the upper plate capacitor C3 is 5 volts above earth potential and when the potential of the self-capacitance of the lead between rectifiers W1, W2 and W3 and the grid of valve V1 rises to 5 volts above earth potential, rectifier W5 becomes conducting and the current through resistor R3 flows mainly into capacitor C3; the capacitance of capacitor C3 is so much greater than the self-capacitance of the lead between rectifiers W1, W2 and W3 and the grid of valve V1 that substantially all the current from resistor R3 flows into capacitor C3. During the coincidence of the pulses the potential of the grid of valve V1 thus rises to 5 volts above earth potential and after the disappearance of the two coincident pulses the potential of the grid of valve V1 decays towards earth potential mainly through resistor R7. Shortly after the disappearance of the coincident pulses a negative going pulse appears on pulse lead KS2 and during the presence of those pulses the self capacitance associated with the lead between rectifiers W1, W2 and W3 and the grid of V1 is discharged, rectifier W7 clamping the final discharged potential of the self capacitance to a value silghtly below earth potential. The lead, after one of the pulses KS2, is thus at a potential whose value does not depend on the amplitude of a pulse that may have preceded the pulse. Thus in the presence of a hold signal on either pair circuit 1 or lead 5 a pulse of 5 volts amplitude appears at the grid of valve V1 when the pulses of pulses $P^x/_9$ and $P^y/_{11}$ coincide; this they do at intervals of 99 microseconds and the individual pulses form the unmodulated pulses of the channel.

When speech signals are present on pair circuit 1 the potential above earth potential of the upper plate capacitor C3 will be 5 volts plus the algebraic instantaneous voltage of the speech signal that appears on the secondary winding of transformer T1; it is so arranged by means of limiters (which are not shown in the figure) that the instantaneous peak voltages of the speech signals that appear across the resistor R4 do not exceed 2½ volts, so that the potential of the upper plate of capacitor C3 may vary between 2½ and 7½ volts above earth potental. In the presence of speech signals on pair circuit 1 the pulse that appears at the grid of valve V1 will be limited not to 5 volts but to the voltage of the upper plate of capacitor C3 at the instant of the coincidence between one of the pulses $P^x/_9$ and one of the pulses $P^y/_{11}$ and the channel pulses of the circuit will be amplitude modulated by the speech signals that appear on pair circuit 1.

The apparatus between pairs 1 and 2 and lead 5 and point M1 form what is known as a pulse modulator. Pulse modulators, utilising other combinations of $P^x/_9$ and $P^y/_{11}$ pulse supplies may be connected in parallel at point M1 and similar groups of pulse modulators may be connected together at point M1, rectifiers W4 and W6 acting as decoupling components.

Valve V1 is a cathode follower amplifier whose output circuit is connected to the grid of valve V2 (another cathode follower amplifier) through a pulse modulator comprising resistors R9, R10 and R11, capacitor C7 and rectifiers W12, W13 and W14. In the absence of pulses from lead KS1 or capacitor C6, each of the equal currents through resistors R9 and R10 to the −150 V. source exceeds the current from the +200 V. source via resistor R11 and the difference between the sum of the currents through resistors R9 and R10 and the current through resistor R11 flows through rectifier W14 in its conducting direction; the potential of the grid of valve V2 is then slightly below earth potential. A positive going pulse of pulses from KS1 or from cathode follower amplifier V1 will cut- off the current through resistors R10 or R9 but current will still flow through rectifier W14 in its conducting direction. When one of the pulses KS1 coincides with a pulse from cathode follower amplifier V1 the current from the +200 V. source through resistor R11 charges the self-capacitance of the lead between resistor R8 and the grid of valve V2. The pulse amplitude of pulses KS1 greatly exceeds the maximum modulated pulse amplitude of 7½ volts that may appear at the output of cathode follower amplifier V1. The potential of the grid of valve V2 rises during coincidence of a pulse from the output of cathode follower amplifier V1 and one of the pulses KS1 until the grid potential is equal to the amplitude of the pulse at the output of cathode follower amplifier V1; when that potential is reached current from the +200 V. source flows via rectifier W12 to the low output impedance of cathode follower amplifier V1 so that the pulse that appears at the grid of valve V2 has the same amplitude as the pulse from the cathode follower amplifier V1 and the duration of the pulses KS1, since the duration of the pulses KS1 is of the order of 0.2 microsecond whereas the duration of the pulses from the cathode follower amplifier V1 is of the order of 0.8 microsecond. The pulses KS1 occur every microsecond and are used as shaping pulses for the channel pulses that appear on lead 8: by this means all channel pulses will have the same duration from whatever combination of pulses $P^x/_9$ and $P^y/_{11}$ they are derived.

The circuit to the left of the vertical dashed line of Figure 10 shows one way in which speech and hold signals from a 2-wire subscriber's line may be connected to a pulse modulator. The subscriber's 2-wire line is connected to a hybrid transformer T6 which has a balancing network BAL. To the centre point of the 2-wire winding of that transformer are connected capacitor C16 and the exchange supply +50 V., R18 and earth. When the subscriber is disengaged no current flows from the +50 V. supply through resistor R18 and the upper terminal of resistor R18 is at earth potential. Lead 5 is connected to the upper end of resistor R18 and whilst the subscriber is disengaged the earth potential on lead 5 prevents channel pulses of the circuit appearing on lead 8. When the subscriber is engaged current from the + 50 V. supply flows through the subscriber's instrument and his line and hence through resistor R18 and the potential of the upper end of that resistor is arranged to rise at least 8 volts above earth potential. When the potential of lead 5 rises by that voltage, channel pulses of the circuit appear on lead 8. When a subscriber's line is connected to a pulse modulator the circuit associated with pair circuit 2 need not be provided.

The receive portion of the circuit is shown above the transmit portion which has just been described. To lead 7 are connected pulse modulators which will be described more fully later, but which are essentially similar to that already described; the circuit elements associated with valves V3 and V4 and lying between lead 7 and point N2 perform the discharging and pulse shaping duties which are performed by the circuit elements that lie between point N1 and lead 8. Points N2 and M2 are paralleling points similar to point N1 and M1 and rectifiers W15 and W16 act as decoupling elements as did rectifiers W6 and W4. Once again each of the equal currents through resistors R13 and R14 exceeds the current through resistor R15 and the difference between the sum of the currents through resistors R13 and R14 and current through resistor R15 flows in the conducting direction through rectifier W19 so that the potential of the junction between rectifiers W17, W18 and W19 is slightly below earth potential. When coincident pulses appear from pulses $P^x/_9$ and $P^y/_{11}$ the currents through rectifiers W17 and W18 are cut off and the current through resistor R15 charges capacitor C10 until the potential of its upper plate is equal to the output potential of cathode follower amplifier V4; when that potential is reached the current through resistor R15 flows through rectifiers W16 and W15 to the low output impedance of the cathode follower amplifier V4 so that the potential of the upper plate of capacitor C10 is made equal to the potential of the pulse that coincides with the simultaneous coincidence of pulses $P^x/_9$ and $P^y/_{11}$; diode V5 clamps the potential of the lower plate of capacitor C10 to 4 volts above earth potential. When the pulse at the output of the cathode follower V4 disappears, the potential of the upper and lower plates of capacitor C10 drops by a voltage equal to the amplitude of the pulse from the cathode follower amplifier V4 and the potential of the lower plate thus drops by that voltage from the clamping voltage of 4 volts above earth potential. The potential of the lower plate of capacitor C10 then charges slowly via resistor R16 towards earth potential until the next channel pulse which coincides with the next coincidence between pulses $P^x/_9$ and $P^y/_{11}$ occurs. Thus the potential of the lower plate of capacitor C10 has a negative going saw tooth waveform whose amplitude is equal to the pulse amplitude of the channel pulses at the output of the cathode follower amplifier V4 that coincide with the coincidences of pulses $P^x/_9$ and $P^y/_{11}$. If no channel pulse coincides with the coincidences of pulses $P^x/_9$ and $P^y/_{11}$ the potential of the lower plate of capacitor C10 remains at earth potential. If the channel pulse is modulated by speech signals then the saw tooth waveform will be similarly modulated in amplitude. Valve V6 amplifies the voltage that is applied to its grid-cathode circuit and in its anode circuit are connected transformers T3 and T4. Transformer T4 is connected to a low-pass filter F1 which cuts off at one half of the 10.1 kc./s. pulse repetition frequency of channel pulses; in pair circuit 3 appear the speech signals that were used to modulate the channel pulses that appeared on lead 7. Transformer T3 is tuned by capacitor C11 to resonate at the pulse repetition frequency (10.1 kc./s.) of the channel pulses; when channel pulses which coincide with coincidences of pulses $P^x/_9$ and $P^y/_{11}$ appear on lead 7, a 10 kc./s. signal appears across the secondary winding of tuned transformer T3 and that 10 kc./s. signal is rectified by rectifier W20 to bias the grid of valve V7 to its operating state from the non-operating state at which it was held by the connection of the secondary winding of tuned transformer T3 to the −10 V. supply. When the valve V7 is biased to its operating state it oscillates by reason of the back-coupled transformer T5 which is tuned by capacitor C13 to a suitable frequency, here assumed to be 10 kc./s., and a 10 kc./s. signal appears on pair circuit 4. The appearance of a 10 kc./s. signal on pair circuit 4 depends on the appearance of channel pulses on lead 7 which coincide with coincidences of pulses $P^x/_9$ and $P^y/_{11}$ and the appearance of channel pulses on lead 7 will be shown later to depend on the presence on pair circuit 13 (Fig. 11) of a hold signal. To the left of the vertical dashed line (Fig. 10) pair circuit 3 is shown connected via hybrid transformer T6 to a subscriber's 2-wire line SL.

The apparatus lying between lead 6 and the dotted lead S (Fig. 10, lower right) is similar in its operation to the apparatus in the figure that lies immediately above it. If lead 6 is at earth potential no pulses appear at the position S but if the potential of lead 6 is raised above earth potential pulses appear at S on the coincidence of pulses $P^x/_9$ and $P^y/_{11}$. The pulses that appear at S are known as marker pulses and they coincide with the pulses that appear on lead 8 when a hold signal is applied to either pair circuit 2 or lead 5. Valves V10 and V11 form a transformer coupled amplifier with a transformer output (T8); the first stage valve is a pentode (V10) whose suppressor grid is connected to lead 9. A negative potential on lead 9 prevents valve V10 from passing anode current and therefore inhibits the amplifying function of the amplifier. The use of the amplifier and the apparatus connected to lead 6 will be described later.

B. *Connector side circuit arrangements* (*Fig. 11*)

In Figure 11 are shown the apparatus associated with a circuit on the connector side of the switch and apparatus common to the switch.

Each circuit connected to the connector side of the switch can be connected through the common leads 7 and 8 to any one of the circuits connected to the multiplex side of the switch by applying to lead 11 pulses that coincide with the channel pulses of the multiplex side circuit to which the connector side circuit is to be connected, i. e. a selector pulse train. The pulse modulator comprises the apparatus between pair circuit 12 and 13 and the common lead 7; speech signals may be connected to pair circuit 12 and a 10 kc./s. hold signal may be connected to pair circuit 13. It is so arranged that in the absence of a hold signal on pair circuit 13 and a pulse on lead 11 the current through resistor R20 exceeds that through resistor R21, the difference between those two currents flowing through rectifier W24 in its conducting direction. The potential of the junction between rectifiers W23 and W24 is then slightly below earth potential. In the presence of a positive going pulse on lead 11 the current through rectifier W23 is cut off and the current through resistor R21 flows through rectifier W26 to capacitor C20 and again the potential of the junction between rectifiers W23 and W24 remains only slightly above earth potential. If a hold signal is applied to pair circuit 13 the upper plate of capacitor C20 is charged to a potential of at least 8 volts above earth potential and then, when a pulse appears on lead 11, the current through rectifier W23 is cut off and the current through resistor R21 charges the self capacitance of the lead connecting rectifiers W22 and W21 to lead 7 until the potential of that lead equals the potential of the upper plate of capacitor C19. The action of this part of the circuit is thus similar to that of the pulse modulator connecting pair circuits 1 and 2 to lead 8, and on lead 7 will appear channel pulses amplitude modulated by speech signals on pair circuit 12 when a hold signal is applied to pair circuit 13. The apparatus in Figure 11 to the right of points *m*1, *m*2 and *m*3 is individual to one of the circuits connected to the connector side of the switch. At points *m*1, *m*2 and *m*3 the circuit shown is connected in parallel with other similar circuits to form groups of circuits and the groups of circuits may be connected in parallel at points *n*1, *n*2 and *n*3, rectifiers W21, W22, W29, W30, W35 and W36 acting as decoupling elements. The channel pulses that appear on lead 7 pass through the apparatus between lead 7 and point N2 on Figure 10 in which they are operated upon by the KS1 and KS2 pulses as were the channel pulses that appeared at point N1 in Fig. 10.

Any unmodulated or modulated channel pulses that appear on lead 8 and coincide with the pulses on lead 11 will charge capacitor C21 in a way similar to that in which capacitor C10 was charged. The apparatus to the right of capacitor C21 demodulates the channel pulses and produces in pair circuit 15 copies of the speech signals that were applied to the pair circuit 1 whose channel pulses coincide with the pulses on lead 11, and on pair 16 will appear a 10 kc./s. hold signal whose presence depends on the presence of a hold signal in pair circuit 2 or on lead 5 of the channel whose chanel pulses coincide with the pulses on lead 11.

The pulses on leads 11 of all the circuits on the connector side of the switch are combined through rectifiers arranged in groups and including rectifiers W36 and W35 and applied to the two stage transformer coupled amplifiers V15, V16. The pulses that appear on lead 9 are arranged to be negative going pulses and these pulses are applied to the suppressor grid of valve V10 (Fig. 10) so that no pulses can appear on lead 10 if coincident pulses are present on any of the leads 11 of the circuits connected to the selector side of the switch.

Figure 12:
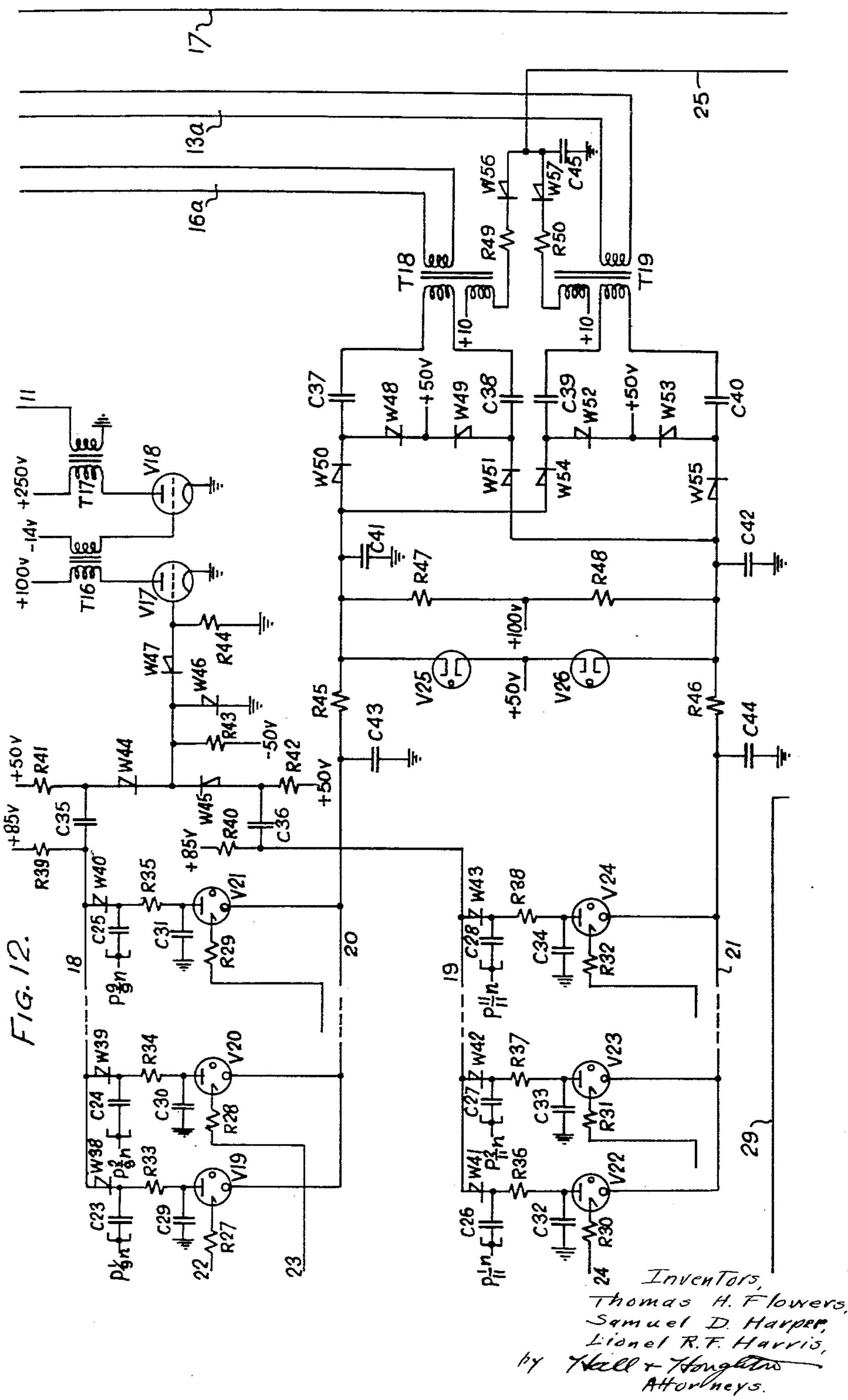

C. *Slave selectors* (*Fig. 12*)

Each circuit on the connector side of the switch has associated with it a slave selector which is used to generate the pulses that appear on lead 11; i. e., the selecting pulses.

The operation of the slave selector will now be described with reference to Fig. 12. As has already been described each connector circuit is associated with a slave selector which may be caused to generate any of the 99 time-spaced pulse trains on a lead, for example lead 11 which is connected to the selector gates of the associated circuit. Each slave selector includes two groups of registers which in the embodiment of the invention shown in Fig. 12 are cold cathode gas discharge tubes or thyratrons. One group consists of 9 such thyratrons, three of which V19, V20 and V21 are shown in Fig. 12. Each thyratron in the group is associated with one of the 9-phase pulse trains. Thus V19 is associated with pulses P1/9, V20 with pulses P2/9, V29 with pulses P9/9 etc. Similarly the other group consists of 11 such thyratrons, three of which V22, V23 and V24 are shown in Fig. 12. Each thyratron in the group is associated with one of the 11-phase pulse trains. When a slave selector is operated to produce a particular one of the 99 pulse trains, one cold cathode thyratron in each group of cold cathode thyratrons is struck or operated. The operated cold cathode thyratrons are associated with the 9-phase pulse train and the 11-phase pulse train which have coincident pulses coincident with the pulses of the pulse train to be generated. The method of striking the cold cathode thyratrons will be described later in this application.

In the anode circuit of each thyratron in either group is situated a gate circuit which effectively transmits the applied negative going pulses to a lead common to all the cold cathode thyratrons in the group, only when the thyratron is operated and conducting. Thus when one cold cathode thyratron in each group is conducting a negative going 9-phase pulse train will appear on the common lead 18 of the group of 9 cold cathode thyratrons and a negative going 11-phase pulse train will appear on the common lead 19 of the group of 11 cold cathode thyratrons. These two leads are applied to a coincidence gate which transmits only the pulses that coincide on leads 18 and 19. The pulses transmitted by the coincidence gate are amplified and transmitted over lead 11 to the connector gates. These are the so-called selecting pulses.

The operation of the coincidence gate is similar to that of the channel modulator already described in connection with the multiplex equipment. The common leads 18 and 19 are connected to the coincidence gate via capacitors C35 and C36, which are connected to the junctions of resistor R41 and rectifier W44, and resistor R42 and W45 respectively. Substantially equal currents flow through these two resistors and through the low forward resistance of the rectifiers which are connected together so that the current is shared between the resistor R43 and the rectifier W46. The current flowing in R43 is substantially less than that flowing in either R41 or R42 so that the current normally flowing through the low forward resistance of rectifier W46 is greater than that flowing in either R41 or R42. The negative going pulses applied over leads 18 and 19 back off the rectifiers W44 and W45 during the pulse so that the current in the rectifier W46 fluctuates. These current fluctuations produce only a small voltage change across the rectifier W46 unless there is coincidence between the pulses applied on leads 18 and 19 when both rectifiers W44 and W45 are backed off and rectifier W46 is also backed off by the current in resistor R43 for the duration of the pulse. This causes rectifier W47 to conduct and a negative going pulse appears across resistor R44. The rectifier W47 minimises the effect of small fluctuations of voltage across W46. Provided that W46 is conducting W47 will be backed off and will attenuate the fluctuations transmitted to R44.

The negative going pulse appearing across R44 reduces the current in triode V17 which is the first valve in a two stage transformer coupled amplifier in which the unwanted fluctuations are finally eliminated by biasing back the grid of the second stage in which full advantage of the duty cycle is taken. The required positive going selecting pulse is thence transmitted via phase reversing pulse transformer T17 over lead 11 to the selector gates.

The operation of the gates associated with the cold cathode thyratrons will now be described. The anode of each cold cathode thyratron for example V19 is connected via a resistor R33 to a rectifier W38 which is connected to the common lead 18. This common lead is connected to the coincidence gate as already described and also via R39 to the +85 v. supply. A negative-going version of a 9 phase-pulse $$P\frac{1}{9}n$$

is applied to the junction of R33 and W38 through a capacitor C23. When the associated cold cathode thyratron V19 is not conducting the peaks of the applied pulses cause current to flow through the low forward resistance of rectifier W38 and the resistors R39 and R41 of the coincidence circuit, which charges the capacitor C23. Between pulses the capacitor C23 discharges slightly through the high reverse resistance of rectifier W38 but the total discharge between pulses is such that the current flowing into C23 during the pulse is substantially less than the current normally flowing in R41. The rectifier W44 is then not backed off during pulses and only small fluctuations are produced on the output of the coincidence gate. When the cold cathode thyratron V19 is conducting the condenser C23 is discharged between pulses not only through the high reverse resistance of rectifier W38 but also through the resistor R33 by the thyratron current. The total discharge of capacitor C23 between pulses is now such that the current flowing into the capacitor C23 during the pulse is greater than the current flowing in R41 so that a larger proportion of the applied pulse voltage appears across R39 and the rectifier W44 is backed off. Clearly by striking combinations of one cold cathode thyratron in each group, selecting pulses may be generated which coincide with the pulses of any of the 99 multiplex pulse trains.

The method of striking the required combination of cold cathode thyratrons will now be described. As already described connections through the switch are set up one at a time and for any one such setting up process the combination of cold cathode thyratrons to be operated is indicated to all the slaves from a master selector which also includes two groups one of 9 and one of 11 cold cathode thyratrons. When a connection is set up a combination of cold cathode thyratrons in the master selector is operated in a manner to be described later and the resulting rise in the potential of the cathodes is applied to the strikers of the corresponding cold cathode thyratrons in all the slaves. The slave which is to be operated by the indicated combination of signals from the master selector is indicated by the presence of a 10 kc./sec. hold signal on either of the two signalling pairs, one for each direction of transmission as already described with reference to Fig. 11 and appearing in the slave selector shown in Fig. 12 over pair circuits 13a and 16a. The presence of a 10 kc./sec. hold signal on either of these pair circuits is used to lower the potential of the cathodes of all the cold cathode thyratrons in the slave selector so that the combination of thyratrons which is marked by the master selector will have sufficient voltage between striker and cathode to initiate a discharge between the anode and cathode. The slave selector will then generate the required selecting pulses and in a manner to be described later this will cause the release of the master selector which may then be used to set up another connection through the switch using some other free slave selector. Once one cold cathode thyratron in each group has been operated the potentials of the cathodes of the remaining cold cathode thyratrons in the slave selector rise sufficiently to prevent any further cold cathode thyratrons in the slave from being operated by subsequent marking from the master selector.

The potential of the strikers of the slaves is normally at 30 v. above earth potential and this rises to 80 v. when the associated cold cathode thyratron in the master selector is operated. To limit transfer current these potentials are applied to the strikers of the slave cold cathode thyratrons through resistors. Three leads from the master selector are shown in Fig. 12. Lead 22 which is associated with pulses P1/9 is applied to the striker of V19 through resistor R27, lead 23 which is associated with pulses P2/9 is applied to the striker of V20 through resistor R28 and lead 24 which is associated with pulses P1/11 is applied to striker of V22 through resistor R30.

The cathodes within each group of cold cathode thyratrons in a slave are connected together. Thus lead 20 is connected to all the cathodes in the group of 9 thyratrons and lead 21 is connected to all the cathodes in the group of 11 thyratrons. When no hold signal is applied over either signalling pair circuits 16a or 13a the potential of the cathode leads 20 and 21 is approximately 50 volts above earth potential. This potential is derived for lead 20 through resistor R45 and the forward resistances of the rectifiers W50 and W48 in parallel with the forward resistances of rectifiers W52 and W54 which are all biased to conduct by the +100 volt supply applied through the high resistance resistor R47. Similarly lead 21 derives its potential through resistor R46 and the rectifiers W52, W53, W54 and W55. The voltage between striker and cathode of the thyratrons is now inadequate to initiate a current discharge in any of the cold cathode thyratrons even though the potential of some of the strikers may be 80 volts above earth potential. The voltage between the cathode and anode is less than the stabilising voltage of the thyratrons so that no cold cathode thyratrons are conducting and the slave is in its non-operated state.

The slave which is to become operated is prepared by the presence of a hold signal on either of pair circuits 13a or 16a. This is a 10 kc./sec. signal and is applied to the primary winding of the transformers T18 and T19. The operation for a hold signal applied over 16a, which as will be described later is the signal used in so called line-finder action, will now be described. The operation for a hold signal applied over 13a, as used in so-called selector action, is the same except that it is initiated by A. C. power over circuit 13a in place of power over circuit 16a. The transformer T18 has two secondary windings, one of which is floating and substantially balanced and is connected via capacitors C37 and C38 to voltage doubling rectifier circuits. Thus one end of the balanced winding is applied via capacitor C37 to a voltage doubling circuit well known to those skilled in the art and consisting of the rectifiers W48 and W50 and the capacitor C41. The other end of the winding is applied via C38 to a voltage doubling circuit consisting of the rectifiers W49 and W51 and the capacitor C42. The capacitors C41 and C42 are common to the voltage doublers associated with both the hold signals. The applied voltage charges C37 and C38 in series so that the resulting D. C. potential which is applied to the cathodes is approximately equal to the peak to peak voltage appearing across the transformer secondary winding. This is made substantially equal to 50 v. so that the cathode potentials fall to approximately earth potential. The voltage between the cathodes and the strikers of the cold cathode thyratrons forming the combination marked from the master selector is then approximately 80 volts and this is sufficient to initiate an anode-cathode discharge and therefore to operate the slave to generate the required selector pulse.

The current taken by the operated cold cathode thyratrons causes a rise in the potential of the cathodes across resistors R45 and R46 and the output impedance of the voltage doubling circuit to a positive potential approximately 20 volts above earth potential. This voltage is sufficient to prevent the striking of any other cold cathode thyratrons in either group but will clearly not rise so much that the voltage between anode and cathode is less than the stabilising voltage of the cold cathode thyratron.

A feature of the circuit is that if for any reason a cold cathode thyratron in one group operates before one in the other group due to variations in the times of application of the signal from the master selector or due to unbalance of the transformer windings which will cause unequal changes in the cathode potentials of the two groups, the load which the operated cold cathode thyratron will put on one side of the secondary will automatically unbalance the transformer and by limiting the voltage swing on one side of the floating winding, will increase the voltage swing on the other so that the cathodes of the unstruck group will tend to be further depressed thus assisting the operation of the unoperated but marked cold cathode thyratron.

To prevent the cathode potentials from going too far negative with respect to earth, which may cause the false operation of a cold cathode thyratron, two gas discharge tubes V25 and V26 connected one to each of the common cathode leads 20 and 21 and to the +50 volt supply prevent the potentials of either group of cathodes becoming more than 15 volts below earth potential. The normal striker potential of 30 volts will thus not cause the false operation of a cold cathode thyratron.

When a cold cathode thyratron has been operated the current taken will introduce a voltage ripple on the cathode lead. This cannot be eliminated by increasing the size of capacitors C41 and C42 without increasing the delay in building up the required change in cathode potential. The ripple is reduced by inserting capacitors C43 and C44 between the cathodes and earth potential and the effect on the anode gate circuits which may introduce variations in the amplitudes of the slave selector pulses is made negligible by connecting the anodes of the cold thyratrons to earth via capacitors. This is shown in Fig. 12 in which capacitors C29, C30 . . . C34 are connected to the anodes of cold cathode thyratrons V19, V20 . . . V24 respectively. These capacitors also minimise the effect of current fluctuations in the operated cold cathode thyratrons.

The presence of the holding signal on either of pair circuits 16*a* or 13*a* will maintain the slave in its operated state and until both signals have disappeared the slave continues to generate the required selecting pulses. Upon release of the connection through the switch both these hold signals disappear and the cathode potentials of the cold cathode thyratrons will rise until the thyratrons are extinguished. The cathode potentials continue to rise as the capacitors C41 and C42 are charged through R47 and R48 until the voltage doubling rectifiers are again conducting and the cathode potentials are again 50 volts above earth potential.

The presence of a hold signal may be used to indicate that the slave selector and its associated circuit are busy. The second secondary windings on transformers T18 and T19 are provided for this purpose and the output of these windings may be rectified by well known means using the rectifiers W56 and W57 and the capacitor C45 common to both hold signals. The lead 25 shown in Fig. 12 is the slave busy indicating lead and when the slave is free its potential is 10 volts above earth potential. The rectified 10 kc./sec. hold signal causes this potential to fall to earth and as will be described subsequently this signal may be used to prevent the re-selection of a busy slave selector. The capacitor C45 is made sufficiently large to continue the busy condition after the hold signals have been removed until the cold cathode thyratrons are completely extinguished. The resistors R49 and R50 in series with the rectifiers W56 and W57 are inserted to limit the load which capacitor C45 would present to the hold signal source.

It has already been described how the cold cathode thyratrons in the slave selectors are struck by the application of a D. C. signal to the striker of the selected cold cathode thyratrons and the striking of two cold cathode thyratrons in a slave selector causes a selecting pulse train to be produced.

D. *Master selector (Fig. 14)*

It will now be described with reference to Fig. 14, how the selection of the two cold cathode thyratrons in the slave selector which are struck to produce a selecting pulse which coincides with particular multiplex pulses, is accomplished. The master selector includes two groups of registers which in the embodiment of Fig. 12 comprise cold-cathode thyratrons. There are 9 tubes in one group and 11 in the other and the twenty cold cathode thyratrons are each associated with a particular 9 or 11 phase pulse train and each has a coincidence gate circuit connected to its striker through a pulse lengthener. Twenty leads, one from the cathode of each master selector cold cathode thyratron are connected to the strikers of corresponding cold cathode thyratrons in the slave selectors.

One such master selector cold cathode thyratron coincidence gate circuit and pulse lengthener comprises valves V27, V28 and V29 and their associated circuit. The operation of this will be described. Capacitors C48 and C49, rectifier W60 and resistors R55, R54 form a coincidence gate circuit the output of which is applied to the control grid of valve V29. Capacitor C48 is connected to pulses $$P\frac{2}{9}n$$

which are negative going 9-phase pulses of 0.8 microsecond duration. Capacitor C49 is connected to a lead which is common to all twenty such circuits in the master selector and on which, when the selector is being set, will be a positive going pulse of 0.8 microsecond duration occurring one microsecond after the time of one of the multiplex pulses to which the slave selector is to be set. This pulse will be referred to as the set up pulse. Normally there will be no set up pulse present. Both pulses $$P\frac{2}{9}n$$

and the set up pulse are derived from a low impedance source so that capacitors C48 and C49 will be charged in series through the forward resistance of rectifier W60 by the negative going pulses $$P\frac{2}{9}n$$

Capacitor C49 has approximately ten times the capacitance of capacitor C48 and as capacitor C49 must discharge through the reverse resistance of rectifier W60, after a few pulses it becomes charged to the peak amplitude of pulses $$P\frac{2}{9}n$$

this voltage decaying only slightly between successive pulses. When this condition is reached charging takes place only on the peaks of the $$P\frac{2}{9}n$$

pulses when sufficient current flows to replace the charge lost by capacitor C49 between the pulses, and at other times the rectifier W60 will be biased to its non conducting condition by the voltage to which capacitor C49 is charged which is the peak amplitude of the $$P\frac{2}{9}n$$

pulses. Capacitor C48 discharges through resistor R55 between pulses and resistor R55 is of such a resistance that capacitor C48 does not build up a permanent charge. Thus the potential at the junction of resistors R54 and R55 is normally that of the −6 v. supply to which resistor R55 is connected, dropping by the amplitude of the $$P\frac{2}{9}n$$

pulses on the incidence of these pulses and returning to 6 volts below earth potential between the pulses. The potential on the control grid of V29 will approximately follow the potential at the junction of resistors R55 and R54 so that the anode current of V29 will be very small.

If a positive going set up pulse which is of smaller amplitude than any of the 9 or 11 phase pulses, occurs at a time which does not coincide with any of the pulses $$P\frac{2}{9}n$$

the potential of both plates of capacitor C49 will rise by the amplitude of the set up pulse and as capacitor C49 is charged negatively to the peak amplitude of pulses $$P\frac{2}{9}n$$

which is greater than the amplitude of the set up pulse, the potential at the junction of capacitor C49 and rectifier W60 will be slightly more negative than the −6 v. potential. At a time between the $$P\frac{2}{9}n$$

pulses the potential at the junction of resistors R54 and R55 will be that of the −6 v. supply so that the rectifier W60 will not conduct when a set up pulse occurs at this time and there will be no change in the grid potential of valve V29 to the set up pulse.

When the set up pulse coincides in time with one of the $$P\frac{2}{9}n$$

pulses, the potential at the junction of resistors R54 and R55 will be negative with respect to the −6 v. supply by the peak amplitude of the $$P\frac{2}{9}n$$

pulses while at the same time, as previously explained, the potential at the junction of capacitor C49 and rectifier W60 will be slightly more negative than −6 volts so that rectifier W60 will conduct and a charging current will flow through capacitor C49 rectifier W60 and capacitor C48, in series. As the capacitance of capacitor C49 is approximately ten times that of capacitor C48, most of the resulting voltage change will appear across C48 which will thus be charged positively. On the back edge of the coincident $$P\frac{2}{9}n$$

and the set up pulses, both plates of capacitor C49 will go negative by the amplitude of the set up pulse and rectifier W60 will cease to conduct. Both plates of capacitor C48 will go positive by the amplitude of the $$P\frac{2}{9}n$$

pulses and as capacitor C48 is charged positively the potential at the junction of resistors R55 and R56 will go positive with respect to the −6 v. supply by the voltage to which capacitor C48 is charged, thus causing valve V29 to conduct until capacitor C48 has discharged.

When valve V29 conducts its anode potential falls and capacitor C47 is charged through the diode V28. When capacitor C48 has discharged sufficiently the anode current of valve V29 will again be cut off and as its anode voltage rises so does the potential on the striker of cold cathode thyratron V27 due to the rise in potential of both plates of capacitor C47. The diode V28 ceases to conduct and the striker of V27 will remain positive with respect to the +90 v. supply at which potential it is normally held, until capacitor C47 has discharged. The cold cathode thyratron V27 has a voltage applied to its anode such that the voltage between anode and cathode is greater than the stabilising voltage of valve V27 but less than that required to cause a discharge between anode and cathode. The striker of cold cathode thyratron V27 is normally held at 90 v. above earth potential which is just below the striking voltage, the cathode potential being 30 v. above earth potential. Thus when the striker potential is raised more than 90 v. above earth potential by the output from the coincidence gate circuit and pulse lengthener, a discharge in cold cathode thyratron V27 will be initiated and a current will flow through resistor R51, thyratron V27 and resistor R52 so that the potential of the cathode of V27 will be raised from 30 v. to 80 v. above earth potential at which potential it is clamped by rectifier W59. This rise in potential is communicated over lead 22 to the strikers of the corresponding cold cathode thyratrons in the slave selectors, causing the one which is suitably prepared to strike as has already been described.

As has already been stated the set up pulses occur one micro-second after the pulses of the multiplex pulses to which the slave selector must be set. This time displacement is a feature of the control circuit which will be described later and to offset it the cathode of the master selector cold cathode thyratron having pulses $$P\frac{x}{9}n$$

connected to its coincidence circuit must be connected to the strikers of slave selector cold cathode thyratrons having pulses $$P\frac{x-1}{9}n$$

connected to their anode gate circuits. Similar gate circuits in the anodes of the master selector cold cathode thyratrons are also provided. The purpose of these will be described later. The gate circuits are similar to those already described for the slave selectors and the gate in the anode of a cold cathode thyratron using pulses $$P\frac{x}{9}n$$

in its associated coincidence circuit must also be connected to pulses $$P\frac{x-1}{9}n$$

The master selector consists of twenty circuits as have already been described. Nine of these circuits are associated with the nine phase pulses and eleven are associated with the eleven phase pulses.

Figure 13:
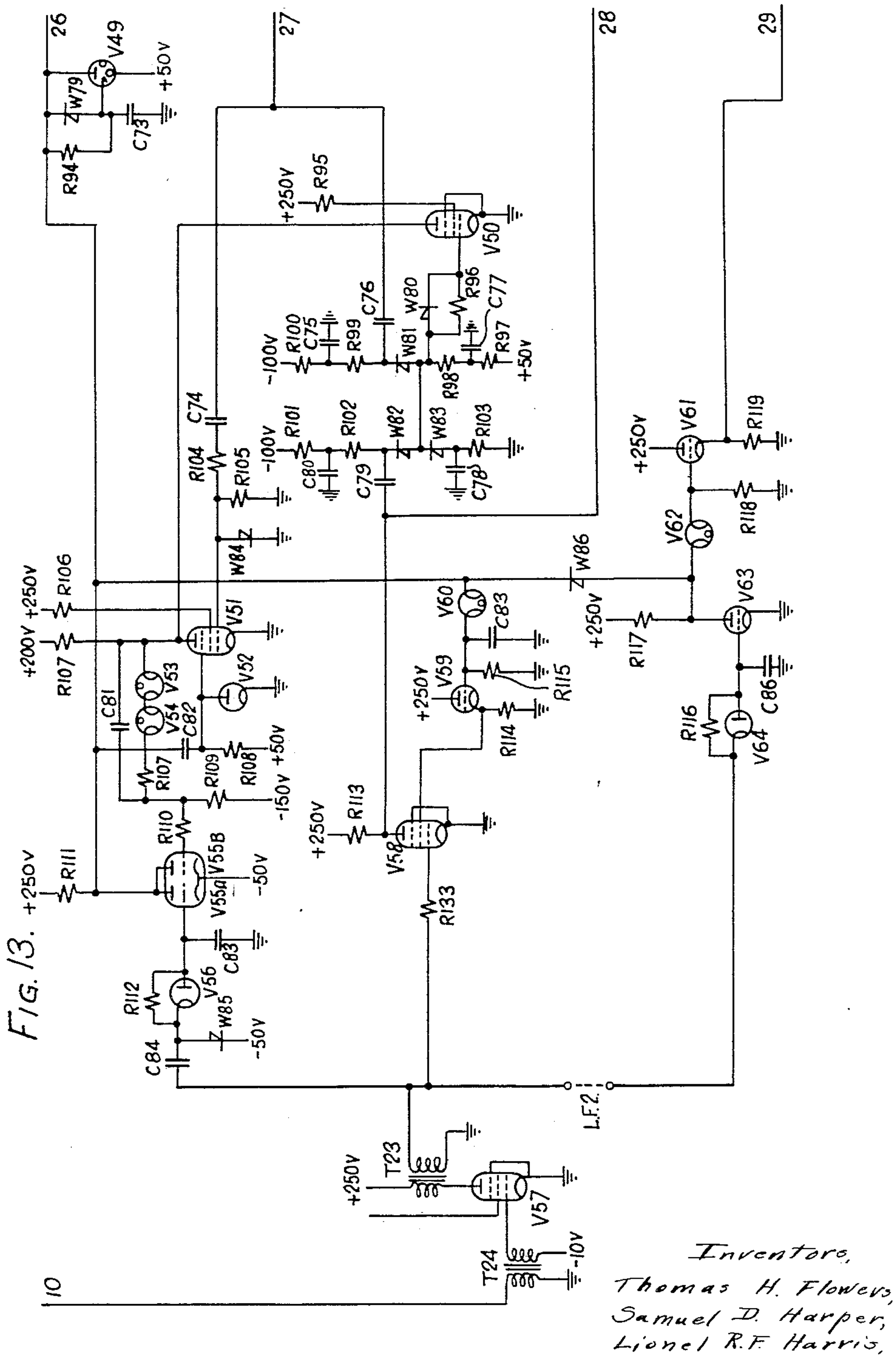

E. *Master selector control circuits* (*Figs. 13–14*)

The master selector has associated with it a control circuit which controls the setting up and release of the master selector. It also performs a checking action on the setting of the master selector and differentiates between the operation required for "selector action" and "linefinder action."

The control circuit controls the master selector by applying an anode voltage to the cold cathode thyratrons in the master selector, when the master selector is to be used, and removing this voltage when a slave selector has been correctly set by the master selector. As previously described a set up pulse is fed into the master selector to operate the appropriate cold cathode thyratrons which are associated with the 9 and 11 phase component pulses of the particular multiplex pulse train to which a slave selector is to be set. This set up pulse is produced in the master selector control circuit by selecting at random any one of a number of calling or marking pulses which may be present at the input to the control circuit. The checking action on the setting of the master selector is performed in the control circuit by comparing an internal selecting pulse train, which is produced in the master selector in the same way that a selecting pulse train is produced in the slave selector, with the original marking pulse to which the master and slave selectors are required to be set. This internal selecting pulse produced in the master selector will be referred to as the "secretary pulse."

1. OPERATION IN SELECTOR ACTION

The operation of the master selector control circuit will now be described with reference to Fig. 13 and Fig. 14 for selector action in response to a marking pulse. In this case the links LF1 and LF2 of Figs. 10 and 13 will be disconnected, and link S in Figure 10 will be connected. In the unoperated or rest condition of the control circuit, the triode V55A is conducting, its cathode potential being 50 volts below earth potential, so that the anode potential is about 60 volts above earth potential. Lead 26 connects the anode of valve V55A to the anodes of the master selector cold cathode thyratrons, through decoupling resistors R92 and R93 which separate the thyratrons associated with the 9 phase pulses and the 11 phase pulses. In the master selector each cold cathode thyratron has a gate circuit in its anode circuit similar to that used in the slave selectors and a decoupling resistor is interposed between the common H. T. lead and the anode of the thyratron. Valve V51 is normally conducting and its anode is coupled to the grid of valve V55*b*, which is normally cut off, to form a trigger circuit.

For every circuit on the multiplex side of the switch that is to be marked a marking potential will be applied to its lead 6 (Fig. 10) and the channel's channel pulses will be applied to the grid of valve V10. On lead 9 will appear the channel pulses of all the multiplex channels that are connected to circuits on the connector side of the switch, so on lead 10 will appear only the channel pulses of the marked multiplex side circuits that are free and not already connected to connector side circuits.

Lead 10 is connected through transformer T24 to the control grid of valve V57 which is biased to cut off, so that the positive going marking pulses cause negative pulses to appear at the anode in the primary of transformer T23. Negative going pulses are produced in the secondary of T23 and these are applied through capacitor C84 to a pulse lengthening circuit on the control grid of triode V55A. The negative going pulses charge capacitor C83 through the diode V56. The discharge path is through resistor R112, whose resistance is large, and the backward resistance of rectifier W85, so that capacitor C83 does not discharge appreciably during the interval between pulses and the grid of valve V55A is maintained sufficiently negative to cut off the anode current. This causes the anode potential to rise from 60 volts to approximately 230 volts above earth potential, thus applying H. T., i. e. high voltage over lead 26 to the anodes of the master selector cold cathode thyratrons. Rectifier W86 (Fig. 13, lower center) is non-conducting under these conditions, so that the apparatus connected to the lower terminal of that rectifier has no effect. As the potential of lead 26 rises, the potential of the control grid of cathode follower valve V59 is raised from earth potential through the potential dropping gas discharge tube V60, to approximately 160 volts above earth potential. This causes the cathode potential of V59 and the screen grid potential of valve V58 to rise to about 150 volts above earth potential. The negative going pulses from the secondary of transformer T23, which are applied to the control grid of valve V58 through resistor R133 will now cause positive going pulses to appear at the anode of valve V58 at the same time the high voltage is applied to the master selector cold cathode thyratrons over lead 26.

The positive-going pulses from valve V58 pass over lead 28 to the control grid of valve V48, which is biased to cut off, so that a negative-going pulse is applied to the anode of blocking oscillator valve V47 causing a pulse of current to flow through the anode winding of transformer T21. The blocking oscillator valve V47 is biased so that it is normally quiescent and the pulse of current in T21 causes it to trigger and produce in resistor R91 a positive going pulse whose duration is controlled by delay line D3 to 0.8 microsecond. This method of control by the use of a delay line is well known to those skilled in the art and will not be further described here (Ref., Benjamin Journal I. E. E., vol. 93, part IIIA, No. 7). The positive going pulse produced by valve V47 is passed to the suppressor grid of pentode valve V43 whose potential is normally held at 100 volts below earth potential through resistor R91 so that anode current is cut off except when a positive going pulse is present. Positive going KS3 pulses are applied to the control grid of valve V43 through capacitor C69, while the D. C. potential of this grid is controlled from lead 26 through gas discharge tubes V44, V45, V46 and the potentiometer formed by resistors R86 and R85 which are arranged so that the potential of the control grid of valve V43 is raised to 20 volts below earth potential at which potential it is clamped by rectifier W77, when the potential of lead 26 is 230 volts above earth potential. Thus a 0.2 microsecond duration KS3 pulse on the control grid of V43 falling within the 0.8 microsecond pulse on the suppressor grid will cause a 0.2 microsecond duration pulse of anode current to flow in the primary winding of transformer T22, which is also connected to the anode of the normally quiescent blocking oscillator valve V42, so that the blocking oscillator is triggered to produce a 0.8 microsecond duration positive going pulse across resistor R83. The duration of the pulse is controlled by delay line D2, and having produced a pulse the blocking oscillator V42 blocks so that it cannot again be triggered for a period of 150 microseconds. The natural blocking period of the blocking oscillator valve V42 is increased by the addition of capacitor C68 to that of the delay line D2. The pulse produced in resistor R83 is the set up pulse previously mentioned in the description of the master selector. It has also been stated that the set up pulse occurs one microsecond later in time than the marking pulse which initiated it. This is because a delay of approximately 0.5 microsecond is incurred in traversing valves V57, V58, V48 and V47, so that the pulse produced by valve V47 would be too late or too early to serve as a set up pulse, but by using this pulse to gate a KS3 pulse the blocking oscillator valve V42 is made to produce a set up pulse which is centered on a pulse occurring one microsecond after the originating marking pulse. This time delay is off-set in the master selector as previously described.

An advantage is gained in the use of blocking oscillators to regenerate the marking pulse, in that the nature of the blocking oscillator makes it impossible for it to be only partially operated. When the marking multiplex is operated the pulses appearing on lead 10 will gradually increase in amplitude and again as the gate formed by valve V58 is opened, pulses appearing on lead 28 will gradually increase in amplitude, but the blocking oscillator valve V47 will only trigger when the pulses have reached a sufficiently large amplitude, and it will then produce a pulse of full amplitude to gate a KS3 pulse in valve V48.

The set up pulse causes two cold cathode thyratrons in the master selector to strike and the current which flows in these thyratrons is drawn through resistor R111 in the anode of valve V55, so that the potential of lead 26 falls from 230 volts to 180 volts above earth potential causing the D. C. potential of the control grid of valve V43 to drop to 40 volts below earth potential thus cutting off any further anode current pulses before blocking oscillator valve V42 is able to fire again.

2. GENERATION OF SECRETARY PULSE

It has already been described how the striking of cold cathode thyratrons in the slave selector is caused to open a gate circuit and allow a 9- or 11-phase pulse train to pass through on to the common anode lead. In a similar manner, the striking of two cold cathode thyratrons in the master selector causes a 9-phase and an 11-phase pulse train to appear on the leads common to the anodes of the cold cathode thyratrons associated with the 9- and the 11-phase pulses respectively. Capacitors C64 and C63 together with resistors R76, R75, R74 and rectifiers W75, W73 and W72 form a coincidence gate circuit of the type already described, but with the addition of an inhibiting lead comprising resistor R73 and rectifier W71. This inhibiting lead normally carries a current equal to the current drain in either leg of the coincidence gate circuit, so that no output can be produced at the grid of valve V40. Valve V39 is normally non-conducting but as the potential of lead 26 rises capacitor C62 is charged from the potentiometer formed by resistors R71 and R72, through the backward resistance of rectifier W70 so that approximately 350 microseconds after the potential on lead 26 has risen, valve V39 conducts and draws the inhibiting current flowing in resistor R73, so that rectifier W71 becomes non-conducting. The coincidence gate circuit is now capable of producing an output on the coincidence of pulses through capacitors C63 and C64. The inhibition is necessary to prevent the drop in HT lead potential caused by the striking of the cold cathode thyratrons in the master selector, producing a false output pulse from the coincidence gate circuit. The inhibition on the coincidence gate circuit for 350 microseconds prevents an output being produced until the D. C. potential of the HT leads to the master selector has become stable. The significance of this arrangement will be more fully understood when the method of checking the master selector setting is described.

When two master selector cold cathode thyratrons have been struck and the inhibition has been removed from the coincidence gate circuit, a negative going pulse which is synchronous with the originating marking pulse will be produced at the control grid of valve V40 which is normally conducting.

Resistor R78 decoupled by capacitor C65 in the cathode of valve V40 causes the steady cathode potential to be 35 volts above earth potential so that rectifier W75 is normally biased to its non-conducting region by about 15 volts and only an output pulse from the coincidence gate circuit which exceeds 15 v. will reach the control grid of valve V40. In this way break through and noise are eliminated. A positive going pulse produced at the anode of valve V40 is passed through capacitor C66 to trigger blocking oscillator valve V41 which will produce in resistor R81 a positive going pulse of 0.8 microsecond duration, controlled by delay line D1. This pulse is the secretary pulse previously mentioned and it is centred on the original marking pulse which set the master selector. If due to some fault the wrong cold cathode thyratrons in the master selector are struck, then the secretary pulse will not coincide with the marking pulse and this state is used to release the master selector.

3. APPLICATION OF SECRETARY PULSE

The secretary pulse is transmitted over lead 27 to the coincidence gate circuit of the type already described, comprising resistors R102, R99, R98 with rectifiers W82, W83, W81 and capacitors C79 and C76. The additional resistors R101, R103, R100 and R97 with decoupling capacitors C80, C78, C75 and C77 serve to provide a suitable bias on the control grid of V50, which is normally cut off. If the 0.8 microsecond duration secretary pulse coincides with the 0.2 microsecond duration marking pulse which appears on the anode of valve V58, a positive going pulse will be produced on the control grid of valve V50. Rectifier W80 in conjunction with the grid capacitance of valve V50 causes a small degree of pulse lengthening to occur so that a negative going pulse of approximately 1 microsecond duration appears at the anode of valve V50, which is connected to the anode of valve V51. The secretary pulse also charges capacitor C74 through resistor R104 and rectifier W84 so that on the back edge of the secretary pulse, rectifier W84 is backed off and the control grid of valve V51 is taken negative, cutting off anode current until capacitor C74 has discharged through resistor R105. As valve V50 is drawing current while valve V51 is cut off there will be no change in the anode potential of valve V51. If the necessary pulse does not coincide in time with the original marking pulse appearing at the anode of valve V58, there will be no output from the coincidence gate circuit on to the control grid of valve V50, so at the back edge of the secretary pulse the anode current of valve V51 is cut off, valve V50 will also be cut off, and the potential of the anode of valve V51 will rise.

It has previously been stated that valve V51 forms a trigger circuit with valve V55B and this now operates in the following way. As the anode potential of valve V51 rises the control grid potential of valve V55B which is normally beyond cut off, is raised through gas discharged tubes V53 and V54 and the potentiometer formed by resistors R107 and R109 and makes V55B conduct. Resistor R110 prevents the trigger circuit being misoperated by noise, and capacitor C81 increases the speed of operation of the trigger circuit. As valve V55B conducts its anode potential falls, so reducing the potential of lead 26 and the potential of the suppressor grid of valve V51 is taken negative through capacitor C82, which has charged through diode V52 as the potential of lead 26 rose at the commencement of setting up operations. Diode V52 is then biased to its non-conducting state and the anode current of valve V51 will be cut off at the suppressor grid until capacitor C82 has discharged through resistor R108. The trigger circuit is thus stable with valve V55B conducting and valve V51 cut off, until capacitor C82 has discharged sufficiently to allow anode current to flow in valve V51, thus cutting off the anode current of valve V55B again. The time taken for the trigger circuit to reset is 5 milliseconds, which is adequate to allow the cold cathode thyratrons in the master selector to de-ionise.

4. RELEASE OF MASTER SELECTOR

Normal release of the master selector and control circuit is as follows. As already described correct striking of two cold cathode thyratrons in the master selector causes a secretary pulse to be produced, which will coincide in time with the original marking pulse, causing an output from the coincidence gate circuit, which will inhibit the operation of the master selector high voltage trigger circuit of valves V55B and V51 by the secretary pulse. When a slave selector has been set by the master selector, a selecting pulse train is produced which coincides with the originating marking pulses, causing the latter to be suppressed. The marking pulse disappears from lead 10 and thus there is no output from the coincidence gate circuit so that the inhibition preventing the secretary pulse operating the master selector high voltage trigger circuit, is no longer operative and the trigger is thrown so removing high voltage from the master selector, and erasing the setting. When new marking pulses appear on lead 10 the process described above will be repeated.

It is evident that if for some reason the master selector sets a slave selector which fails to produce a selecting pulse, the release of the master selector will not take place. To overcome this difficulty a time release device is incorporated in the master selector control circuit, and this time release comprises cold cathode thyratron V49 with its associated components.

When the potential of lead 26 is at 60 volts above earth potential the cold cathode thyratron V49 has less than its stabilising voltage between anode and cathode so that no current flows. When the operation of the master selector is initiated the potential of lead 26 rises to 230 volts above earth potential, so that valve V49 has more than its stabilising voltage, but less than its striking voltage, between its anode and cathode. The potential of the striker of valve V49 is held at 60 volts above earth potential until capacitor C73 has charged through resistor R94 and rectifier W79, which is biased to its high resistance condition. It is arranged that after 15 milliseconds the potential on C73 and the striker of V49 has risen sufficiently to cause V49 to strike and draw a current through resistor R111, which will reduce the potential of lead 26 sufficiently to cause the anode current of valve V51 to be cut off at the suppressor grid, through capacitor C82 and to operate the high voltage trigger as already described, de-ionising valve V49 and the cold cathode thyratrons in the master selector. Thus if a selecting pulse is not produced by a slave selector in 15 milliseconds the master selector is released by the time release circuit.

5. OPERATION IN LINE FINDER ACTION

The operation of the control circuit and master selector in line-finder action is similar to that already described for selector action; but in addition the links LF1 and LF2 in Figures 10 and 13 completed and the link S in Figure 10 is broken so that the calling pulse is pulse lengthened and used to switch on high voltage to the marker master selector.

In the line-finder action a marked circuit on the multiplex side of the switch has a hold signal applied to either its pair circuit 2 or its lead 5 and the pulses of all marked multiplex side circuits will appear at the grid of valve V10. As in the selector action only the channel pulses of the free marked multiplex side circuits will appear on lead 10, and a calling channel pulse on lead 10 will produce a negative pulse in the secondary of transformer T23, which traverses link L. F. 2 and charges capacitor C86 negatively through diode V64. The discharge path of C86 is through resistor R116 whose resistance is high, so that C86 does not discharge appreciably between pulses and the control grid of valve V63 is held sufficiently negative to cut off its anode current. The anode potential of V63 rises and lifts the control grid of cathode follower valve V61 through the voltage dropping gas discharge tube V62. As the potential of the control grid of valve V61 rises so the cathode potential rises, finally applying a potential of approximately 150 volts above earth potential to the marker master high voltage supply lead 29, thus causing the marker master to operate as will be described later. While the anode potential of valve V63 is rising the potential of lead 26 is also rising so that rectifier W86 does not conduct, but on release of the master selector the potential on lead 26 falls to 60 volts above earth potential causing rectifier W86 to conduct and reduce the anode potential of V63 so that the potential on the marker master high voltage supply lead 29 falls to earth, thus releasing the marker master selector.

As has already been described there are two types of switch described in this application and much of the apparatus used is common to both types. One type is a selector action switch in which a circuit on the multiplex side of the switch is marked for connection through the switch to a circuit on the connector side. In such a connection the connector side circuit and the associated slave connector used is selected at some other part of the exchange as described in copending U. S. patent application Ser. No. 177,411 filed August 3, 1950, and the selected circuit is indicated by the appearance of a hold signal on the signalling pair connected to the selected connector side circuit. This hold signal appears on pair circuit 13*a* in the associated slave selector and prepares the slave selector which is then operated by the D. C. signals received from the operated master selector. Apparatus for performing selector action has now been completely described. In line-finder action a circuit on the multiplex side of the switch calls for connection to any free circuit on the connector side of the switch. In this type of switch it is necessary to select one of the free connector circuits whenever a new connection is set up. The selected connector side circuit is indicated by a change in the D. C. potential of the connector circuit indicating lead for example, lead 17, from a negative voltage to earth potential which as already described may initiate the hold signal on pair circuit 16. This hold signal is also applied to the slave connector associated with the selected selector circuit for example, over pair circuit 16*a* which as already described prepares the slave to be operated by the marking signals received from the operated master selector.

6. SLAVE MARKER (FIG. 15)

The apparatus used in line-finder action to select one and one only of the free connector circuits whenever a new connection is set up i. e. the line-finder selector LFA of Fig. 3 will be referred to as the slave marker in the particular application which will now be described. Each connector circuit is associated with a time-spaced pulse train in a group of time-spaced pulse trains and they are conveniently made the pulse trains derived from the 9-phase and the 11-phase pulse trains already described, although in general the number of connector circuits will be less than 99 and all the combinations will not be required. The slave marker includes a multiplex pulse generator which generates the pulse trains associated with all the free connector circuits. The output from the multiplex is applied to a gate which when the selection of a free connector circuit is required transmits the pulses of all the free connector circuits to the slave marker master control circuit. This control circuit produces on its output a pulse which is a delayed version of one of the pulses that corresponds to one of the free slave selectors and it coincides with the registering pulse occurring one microsecond later than the effective applied pulse. This delayed pulse is then applied to apparatus referred to as the marker master in which the pulse operates a combination of two registers shown in the figure as cold cathode thyratrons, one in each of two groups of registers, the combination being individual to the connector circuit associated with the pulse train whose pulse caused the operation of the marker master. The cathodes of the operated cold cathode thyratrons rise in potential and a resistance network is used to produce a corresponding rise in the potential of the selected connector circuit indicating lead.

This process will now be described in more detail with reference to Fig. 15. On the left of this figure one channel gate of the multiplex is shown to which the 9-phase pulse $P1/9$ and the 11-phase pulse $P1/11$ is applied. There is one such channel gate for each connector circuit and a different combination of a 9-phase pulse and an 11-phase pulse is applied to each. The channel gate shown is associated with the connector circuit of Fig. 11 and the slave selector shown in Fig. 12 and the series rectifier W87 is connected to the slave busy indicating lead 25 via resistor R120. When the slave selector is free the potential of lead 25 is 10 volts above earth potential and rectifier W87 is backed off allowing the coincident positive pulses applied to the channel gate to be transmitted through the gate and through the various multiplex stages and appear across the cathode resistor of valve V65. When the slave selector is busy the lead 25 is at earth potential as previously described with reference to Fig. 12 and when coincident pulses are applied to the channel gate W87 conducts. This slightly charges the capacitor C87 which is connected between the junction of W87 and R120 and earth. The voltage change across C87 during the pulse is negligible and no pulse is transmitted through the multiplex from the channel gate. The type of multiplex used in this application has already been described with reference to Fig. 10 and it will be clear that across the cathode resistor of V65 will appear the trains of positive going pulses, each pulse train being associated with one of the free connector circuits in the group and that the durations of the pulses at this point will be approximately 0.2 microsecond.

These positive going pulses are applied via capacitor C88 to the control grid of the valve V66 which is biased to near cut off through the D. C. restoring rectifier V88. The amplified negative going pulses appearing on the anode of V66 across the primary of transformer T25 are phase reversed in the pulse transformer so that positive going pulses are applied to the control grid of valve V67. The end of the secondary winding remote from the control grid of valve V67 is connected to a bias supply derived from a potentiometer chain. The potential of this point on the potentiometer chain is prevented from going more positive than 10 volts below earth potential by the action of clamping rectifier W89 and is decoupled by capacitor C89 connected to earth. One branch of the potentiometer chain consists of resistor R121 connected to a negative 50 volts supply and the other branch consists of the resistor R123 in series with the two series connected gas discharge tubes V79 and V80 which is connected to master marker H. T. lead 30 and via resistor R122 to the master marker H. T. supply lead 29. As already described with reference to Fig. 13 this lead is normally at earth potential and the potential across V79 and V80 is inadequate to maintain a discharge through them. The control grid of valve V67 is thus biased to a potential of 50 volts below earth potential through resistor R121 and the positive going pulses applied to the grid cause no change in the anode circuit of valve V67. When the connector of a free connector circuit is required the potential of lead 29 rises to 150 volts above earth potential as already described. The subsequent rise in potential of lead 30 to which the anodes of the marker master cold cathode thyratrons are connected prepares the marker master thyratrons to be operated and also initiates a discharge in valves V79 and V80 which causes the potential of the grid of valve V67 to rise to 10 volts below earth potential at which potential it is clamped by rectifier W89. The applied positive going pulses are now effective in V67 and some of the pulses applied cause the blocking oscillator associated with valve V68 to fire. The functions of valves V67 and V68 and their associated components are similar to the functions of valves V48 and V47 already described with reference to Fig. 14. The positive-going output pulses on the cathode of valve V68 are applied to the suppressor grid of a pentode valve V70, to the control grid of which the positive going KS3 pulses are applied. The gated KS3 pulses appear on the anode of valve V69 and one of these fires the delay-line controlled blocking-oscillator associated with valve V69. The functions and operation of this valve are the same as those of valve V42 already described with reference to Fig. 14. The pulse appearing across cathode resistor R124 will be referred to as the marker master set up pulse and it occurs one microsecond after the pulse of the channel gate which initiated the production across resistor R124 of the marker master set up pulse. The slave selector associated with this channel gate is the selected slave selector.

The marker master set up pulse is applied over lead 31 to the marker master. The marker master includes two groups of cold cathode thyratron registers, three thyratrons of which are shown in Fig. 15. Thyratrons V76 and V77 are associated with two of the 9-phase pulse trains and thyratron V78 is associated with one of the 11-phase pulse trains. The anodes of all the thyratrons in both groups are connected to marker master H. T. lead 30 and the cathodes of the thyratron are each individually connected via a resistor to a negative 100 volts supply. The excursion of the potential of each cathode is limited by rectifiers to earth and 50 volts below earth potential. For example, the cathode of thyratron V76 is connected via resistor R128 to a negative 100 volt supply and is prevented from rising above earth potential by rectifier W90 and from falling more than 50 volts below earth potential by rectifier W93. The strikers of the cold cathode thyratrons are each connected to the cathode of diode, the anodes of which are connected to a positive supply of 20 volts. The circuits associated with cold cathode thyratrons in the marker master are otherwise identical to those associated with the cold cathode thyratrons of the master selector, and the operation is similar. The marker master cold cathode thyratrons are prepared by the rise in pootential of lead 30 from earth potential to 150 volts above earth potential when the selection of a free selector circuit is required. The marker master set up pulse cause a particular combination of two cold cathode thyratrons, one in each group, to be struck in a similar manner to that already described for the master selector. The combination of two operated cold cathode thyratrons is thus individual to the selected selector circuit and the subsequent rise in the potential of the cathodes of the operated thyratrons to earth potential may be used to indicate the selected connector circuit. Each connector circuit indicating lead, for example lead 17, is connected to the cathodes of the cold cathode thyratrons with which it is associated through equal resistors. Thus the connector circuit of Fig. 11 and the slave selector shown in Fig. 12 are associated with the thyratrons V76 and V78 and the lead 17 is connected to the cathodes of these thyratons through resistors R131 and R132 respectively. Only when both thyratrons V76 and V78 are operated does the potential of lead 17 rise to earth potential. As previously described this signal is used to initiate a hold signal which prepares the slave selector associted with the selected connector circuit which is operated by the D. C. indications from the master selector.

Having operated one thyratron in each group in the marker master no further thyratrons must be struck. This is affected by preventing further set up pulses from being communicated to the marker master over lead 31. This is achieved by using the voltage drop across resistor R122 due to the current taken by the operated thyratrons, to depress the bias voltage on the grid valve V67 through the aforementioned potentiometer chain so that the positive going pulses appearing across the secondary winding of transformer T25 are no longer effective in valve V67.

There will be some delay before the bias on valve V67 is sufficient to make the applied pulses inoperative in that valve and it is a function of blocking oscillator valve V69 that having produced one set up pulse it is inoperative for a period greater than that taken for valve V67 to be rendered inoperative by the fall in bias potential just described.

It will be clear from the foregoing description that the marker master set up pulse which is derived from a channel gate associated with a free connector circuit operates the combination of two cold cathode thyratrons in the marker master also associated with that connector circuit. The slave selector associated with the selected connector circuits is then operated from the master selector and generates the selecting pulses required to complete the connection. As has already been described the appearance of this pulse on the pulse suppression lead is used to release the master selector and also the marker master. The potential of the marker master high voltage supply lead 29 falls to earth potential again upon release and this fall in potential extinguishes the operated cold cathode thyratrons in the marker master and also the gas discharge tubes V79 and V80. The slave marker is then in its non operated state and is ready to make a further selection of a free connector circuit when required.

F. *Exemplary overall operation*

The operation of the apparatus of Figs. 10 to 15 will now be traced from the initiation of a call from a line such as SL in Fig. 10 through line-finder stages of selection and thence through a selector stage of selection to another line such as SL on the same exchange.

Let it be assumed that the line SL in Fig. 10 is a calling line. Then the apparatus of Figs. 10 to 15 comprise one line-finder stage of selection which operates, when the line SL calls for a connection through the exchange, to connect the line SL to a free trunk comprising circuits 12, 13, 15 and 16 of Fig. 11. When operating in this mode connections LF1, Fig. 10 and LF2, Fig. 13 are made and connection S Fig. 10 is omitted.

The line SL calls for connection through the exchange by a loop on the line which causes current from the exchange battery round the loop which includes resistor R18. The potential of lead 5 thus rises and the channel pulses of line SL appear over the common circuit 8. The channel pulses are derived from one of the 9-phase pulse trains $P^{x}/_{9}$ and one of the 11-phase pulse trains $P^{y}/_{11}$ and will be designated the $n$th channel pulses of the multiplex. The channel pulses over circuit 8 are communicated via valves V10, V11 and V57 to three circuits, the first including valve V55, the second valve V58 and the third valve V63. In the first circuit the pulses are lengthened and used to cut-off valve V55$a$, the anode circuit of which then supplies over lead 26 anode voltages to the cold-cathode registers e. g. V27, V30, V33, V36 Fig. 14, of the master selector; the second circuit repeats the channel pulses over lead 28 after a delay provided by the circuit including valve V59 to give the vale V55$a$ time to cut-off completely; in the third circuit, the channel pulses are lengthened into a continuous positive voltage over lead 29 to start the slave marker circuit of Fig. 15 into selecting a free connector, Fig. 11. One of the pulses over lead 28 operates the blocking oscillator including valve V47, the cathode circuit output of which via the gate circuit including valve V43 operates the blocking oscillator including valve V42 when the next KS3 pulse occurs. The relative timing of the channel pulse over lead 8 and the pulse it produces in the cathode circuit of valve 42 may be seen by reference to the lines KS1 and KS3 in Fig. 9. The pulse over lead 8 coincides with one of the KS1 pulses applied via capacitor C7 of the gate circuit connected to the control grid of valve V2 in Fig. 10; it causes the blocking oscillator including valve V47 to generate a pulse 0.8 $\mu$sec. in duration and the start of which is slightly later than the channel pulse because of the transmission time of the pulse from lead 8 to the anode of the blocking oscillator. The KS3 pulse which occurs 0.6 $\mu$sec. after the channel pulse over lead 8 coincides with the blocking oscillator pulse and starts the blocking oscillator including valve V42 to produce an 0.8 $\mu$sec. set-up pulse, the centre of which coincides with the next KS1 pulse after the channel pulse over lead 8 i. e. with the $n+1$th channel pulse of the multiplex, with a pulse of the $$P\frac{x+1}{9}$$

11-phase pulse train and the $$P\frac{y+1}{11}$$

11-phase pulse train. (Note: If $x=9$, $x+1=1$, and if $y=11$, $y+1=1$.) The positive going set-up pulse is applied to the twenty coincidence gate circuits preceding the cold cathode tube registers which are in two groups, one of nine and the other of eleven. Then the two coincidence gate circuits connected to the $$P\frac{x+1}{9}n$$

and $$P\frac{y+1}{11}n$$

registering pulse trains respectively will detect coincidence between a pulse of the said pulse trains and the set-up pulse. Let it be assumed that $x=1$ and $y=11$. Then coincidence will occur between a pulse of pulse source $$P\frac{2n}{9}$$

and te set-up pulse, and between a pulse of pulse source $$P\frac{1}{11}n$$

and the set-up pulse, and gas-tubes V27 and V36 will be struck. The cathodes of both gas-tubes are raised in potential from +30 volts to +80 volts and mark the leads 22 and 25 respectively out of the twenty leads which are commoned to all the slave selectors. The striking of the two-cold cathode register tubes prevents any further set-up pulses being generated, by lowering the potential of lead 26 and thus causing valve V43 to be cut-off at its control grid circuit. This feature prevents the selection of more than one circuit such as SL should more than one be calling for a connection simultaneously.

Valve V27 being struck gates the $$P\frac{1}{9}n$$

pulse train and valve V36 the $$P\frac{11}{11}n$$

pulse train into a coincidence gate circuit which causes the blocking oscillator circuit including valve V41 to generate a train of secretary pulses coincident with the $n$th channel pulse train of the multiplex. Coincidence between the secretary pulse train over lead 27 and the $n$th channel pulse train over the anode circuit of valve V58 is detected by the coincidence gate circuit the output of which is connected to valve V50, which valve is caused to conduct. The secretary pulses over lead 27 also cause the anode current to the valve V51 to be cut-off, but no action results at this stage because the anode potential of valve V51 is maintained at a low value by the conduction of valve V50.

The slave marker, Fig. 15, includes two groups of cold-cathode tube registers, one group of 9 and the other of 11 tubes, and each combination of one tube struck in each group marks over a lead 17 a free connector circuit and slave selector. The continuous positive voltage signal over lead 29 causes a combination of tubes corresponding to a free connector circuit to be struck. Let it be assumed that the combination in this example is V76 and V78, then lead 17 in Figs. 15, 12 and 11 is raised in potential to start the oscillator including valve V14 into oscillation. The output from the oscillator feeds A. C. power over circuit 16A to the slave selector, Fig. 12. The slave selector includes two groups of cold-cathode tube registers, one group of 9 and the other of 11 tubes. With the assumptions so far made, the striker electrode of tube V19 in the group of 9 tubes is marked with +80 volts over the lead 22 from the tube V27 in the master selector, and the strikers of all the other tubes in the group are held at +30 volts, and the striker electrode of tube V24 in the group of 11 tubes is marked with +80 volts over lead 25 from tube V36 and the strikers of all the other tubes in the group are held at +30 volts. The A. C. signal over circuit 16$a$ lowers the potential of the cathodes of all the tubes in both groups, but only marked tubes V19 and V24 strike. Conduction of these two tubes immediately again raises the potential of all the cathodes so that no further tubes may strike. Tube V19 gates pulse $$P\frac{1}{9}n$$

and tube V24 gates pulse $$P\frac{11}{11}n$$

into a coincidence gate circuit, the output of which coincides with the *n*th channel pulses of the multiplex and is applied to the control grid circuit of valve V17, the output of which is amplified by valve V18 to a selecting channel pulse over lead 11. The channels 3, 4, 1 and 2 of the circuit SL are now connected to the channels 12, 13, 15 and 16 of the trunk connected to the selected connector circuit. The pulses over lead 11 are communicated via valve T14 and T15 to lead 9 to suppress from the anode circuit of valve V10 the *n*th channel pulses over lead 8. Secretary pulses over lead 27 will now no longer coincide with channel pulses in the anode circuit of valve V58. Hence valve V50 will no longer conduct on its anode circuit, and as valve V51 is already cut off, the anode voltage of these two valves rises, valve V55B is caused to conduct and to reduce the voltage over lead 26, and also via rectifier W86 the voltage over lead 29. Both the master selector and slave marker are thus released for use on another call.

Description has so far been given of the connection of line SL over one stage of line-finder operation to a trunk comprising circuits 12, 13, 15 and 16. It is well known in the art that more than one line-finder stage may be necessary in order to connect a calling line to common exchange apparatus, for example, a register-sender which receives and stores dialled numbers from the calling line. A further stage of line-finder operation may be provided in the present example by connecting the circuits 12, 13, 15 and 16 respectively to the circuits 3, 4, 1 and 2 of a further set of apparatus according to Figs. 10 to 15. Let it be assumed for the purposes of the present description that the circuit 12, 13, 15 and 16 of Fig. 11 are connected to circuits 3, 4, 1 and 2 of a further stage of line-finder operation terminated in registers-senders, the line-finders in this case being termed register-sender finders. The connection between the circuits 12, 13, 15 and 16 of Fig. 11 to the circuits 3, 4, 1 and 2 of the register-sender finders is then made not directly, but, as is known in the art, via a bridge circuit which makes the said connection when the call is initiated and breaks the connection when the register has finished its operation and signals that it is to be released. The bridge circuit also provides for connection of the circuits 12, 13, 15 and 16 to the circuits of a further stage of switching in this case circuits 16, 15, 13 and 12 respectively of a first stage of selection according to Figs. 10 to 14 with the connection S in Fig. 10 made, the connection LF1 broken and the connection LF2 in Fig. 13 broken. The said circuits 16, 15, 13 and 12 are also connected over circuits through the register-sender finders to the register-sender, the bridge circuit operating to connect the circuits 16, 15, 13 and 12 to the circuits to the register sender and to disconnect them from the circuits 12, 13, 15 and 16 of the line-finder until the register-sender releases, when the said circuits 16, 15, 13 and 12 are connected over the bridge circuit to the circuits 12, 13, 15 and 16 of the first stage of selection and disconnected from the circuits to the register-finder.

When the line SL calls, it is connected over one stage of line finder switching to a trunk comprising circuits 12, 13, 15 and 16 of Fig. 11, then over a stage of register-sender finder switching to a register-sender which receives and stores the number signals dialled or otherwise communicated by the calling line. The system of the present invention requires the following operation of the register-sender and a marker according to well-known principles. The register-sender on seizure sends back a holding signal which in this case is a backward hold signal over the circuits 13 of the line-finder trunks. This signal holds the slave selectors during the dial pulses. The register-sender having received sufficient called number signals to determine the connection to be made over the exchange, applies for connection to a marker. Because of the high speed of operation of electronic exchanges a single marker suffices for the whole exchange. The register-sender repeats the called number to the marker which selects the group of called circuits designated by the called number signals. In known systems the marker further selects a free circuit in the called group and finds a route over the exchange switches for the connection of the selected free circuit to the calling circuit, or as disclosed in the previously mentioned co-pending patent application Serial No. 177,411, marks all the circuits of the group of called circuits and selection of a free circuit and route over the switches is accomplished by the switches themselves in co-operation with link-markers to mark free trunks between switches. The present invention is applicable to either system of operation. It is sufficient for an understanding of the present invention to describe the simplest case of connection over a single stage of selection from a line-finder trunk to the called line. Hence the single stage of selection represented by Figs. 10 to 14 will be terminated in subscribers' lines of which line SL in Fig. 10 is one, and which may be called from a trunk comprising circuits 12, 13, 14 and 16 connected over a bridge circuit as previously described to the line-in trunk to which the calling subscriber has already been connected. When the register-sender has received all the dialled digits, obtained access to the marker and communicated the called number to the marker, the marker marks the leads 6 of all the circuits in the group identified by the called number and the register-sender sends a forward hold signal over the register-sender finder to the circuit 13 of the first selector trunk.

Let it be assumed that line SL in Fig. 10 is a line in the group identified by the called number and the marker thus marks lead 6 with a voltage which is positive with respect to earth potential. Marker pulses thus appear in the cathode circuit of valve V9, the marker pulses being coincident with the channel pulses of line SL over lead 8. If the line SL is already engaged on a call, pulses which are wider but otherwise coincident with the marker pulses will be appearing over lead 9 to suppress the marker pulses at valve V10. Assuming, however, that the line SL is free, the marker pulses are communicated to lead 10 and cause the master selector of Fig. 14 to operate as previously described to strike two cold-cathode tubes, one in the group of 9 and the other in the group of 11, to mark the similar cold-cathode tubes in the slave selectors and to generate over lead 27 a train of secretary pulses coincident with the marker pulses over lead 10. The forward hold signal from the register-sender to circuit 13 in the first selector trunk provides over circuit 13*a* A. C. power to the slave-selector tied to the first selector trunk. The slave selector responds to the markings from the master selector as previously described by the striking of a cold-cathode tube register in each of the two groups of tubes, whereby a train of selecting pulses is generated over lead 11 to pulse the connector at times coincident with the marker pulses over lead 10. The first selector trunk is then connected to the called line SL, marker pulses for the line SL are suppressed from the lead 10 and the master selector then releases. The register-sender releases and releases the marker for example a predetermined time after seizing the marker. Means of ringing the called line is not shown as it is not part of the present invention, but may be accomplished for example by equipment located in the bridge circuit and arranged to send an audio frequency signal to the called line, the line equipment of which includes means for converting the audio frequency signal to low-frequency ringing current as disclosed in co-pending British patent application No. 25,653/49. When the called subscribed answers there is a talking path from the calling line SL over its hybrid transformer T6 and circuit 1 and line finder switch to circuit 15 of the line-finder trunk, thence over the circuit 12 of the 1st selector trunk and the selector switch to circuit 3 and hybrid transformer to the called line SL, and from the called line SL over its hybrid transformer and circuit 1, the selector switch to circuit 15 of the first selector trunk, thence over circuit 12 of the line-finder trunk, the line-finder switch, circuit 3 and hybrid transformer of the calling line to the calling line SL.

V. EPILOGUE AND CLAIMS

While there have been described herein what are at present considered preferred embodiments of the invention, it will be obvious to those skilled in the art that minor modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The term "bi-stable register" is employed in the following claims to designate the type of register employed herein, as defined in the prologue of this specification.

We claim:

1. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of registers; register operating means to which the trains of marking pulses of the said circuits marked out of said group of circuits are applied, said operating means being responsive to one of the marking pulses applied to it to operate, in the said marked set of registers, that combination of one register in each said group of registers indicating the circuit the train of marking pulses for which includes the said one of the marking pulses.

2. Apparatus according to claim 1 and including means for preventing marking pulses of amplitude less than a predetermined amplitude from being applied to the said means responsive to one of the marking pulses.

3. Apparatus according to claim 2 in which the said means for preventing marking pulses of amplitude less than the predetermined amplitude from being applied to the said means responsive to one of the marking pulses comprises a blocking oscillator pulse generator interposed between the source of marking pulses and the means responsive to one of the marking pulses.

4. Telephone exchange equipment including apparatus according to claim 1 in which the said group of circuits consists of circuits over each of which a line-finder signals its free or engaged condition, a free-condition signal marking a circuit in the said group of circuits, each line-finder being connected in multiple to a group of calling circuits and to an exchange trunk, a calling circuit providing a calling signal when it requires connection to a free exchange trunk and in which the said means for marking a free set of registering means comprises means responsive to a calling signal over a calling circuit which is not connected over a connector switch to an exchange trunk.

5. Apparatus for selecting one of a number of circuits marked out of a group of circuits comprising means: for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of registers; register operating means to which the trains of marking pulses of the said circuits marked out of each group of circuits are applied, said operating means being responsive to one of the marking pulses appiled to it to operate in the said marked set of registers that combination of one register in each said group of registers indicating the circuit the train of marking pulses for which includes the said one of the marking pulses; said means for operating a combination of one register in each said group of registers comprises a set of sources of time-spaced trains of registering pulses arranged in at least one group corresponding to the groups of registers, and synchronised with the said marking pulses so that each pulse of a train of marking pulses coincides with a pulse from one source of registering pulses in each group of sources of registering pulses, the pulses of each train of marking pulses coinciding with a particular combination of one source of registering pulses in each group of sources of registering pulses.

6. Apparatus according to claim 5 in which each register of a set of registers is connected to one of the said sources of registering pulses and to the said means for generating marking pulses and operates on coincidence of a pulse from said one of said sources of registering pulses, a marking pulse, and the said marking of the set of registers.

7. Apparatus for selecting one of a number of circuits marked out of a group of circuits comprising: means for generating a time-spaced train of marking pulses for each of the circuits in the said group of circuits; a master set and at least one slave set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of slave registers; registers operating means to which the trains of marking pulses of the said circuits marked out of said group of circuits are applied, said operating means being responsive to one of the marking pulses applied to it to operate in the said master set of registers that combination of one register in each group of registers indicating the circuit the train of marking pulses for which includes the said one of the marking pulses; and in which each register of each slave set of registers is connected to a register in the master set of registers and operates when the register in the master set is operated and the slave set of registers of which it forms part is marked.

8. Apparatus according to claim 7, further comprising means by which an operated master set of registering means is released when the marking pulses of circuits marked out of the said groups of circuits do not include the train of marking pulses of a circuit indicated by the said master set of registering means.

9. Apparatus for selecting one of a number of circuits marked out of a group of circuits comprising: means for generating a time-spaced train of marking pulses for each of the circuits in said group of circuits; at least one set bi-stable of registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of registers; register operating means to which the trains of pulses of the said circuits marked out of each group of circuits are applied, said operating means being responsive to one of the marking pulses applied to it to operate in the said marked set of registers that combination of one register in each said group of registers indicating the circuit the train the marking pulses for which includes the said one of the marking pulses; and in which means are provided to prevent the operation of a further register in a group of registers after the operation of one register in a group of registers has been initiated or completed.

10. Apparatus according to claim 9 and in which each register comprises a gas-discharge tube.

11. Apparatus according to claim 10 in which the said means for preventing the operation of a further register when one register in a group of registers is operated comprises a resistor common to the cathode circuits of all the gas-discharge tubes of a group of registers.

12. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; register operating means to which the trains of pulses of the said circuits marked out of each group of circuits are applied, said operating means being responsive to one of the marking pulses applied to it to operate in a set of registers that combination of one register in each said group of registers indicating the circuit the train of marking pulses for which includes the said one of the marking pulses; and in which the operation of a further register when one register in a group of registers is operated is prevented by means actuated by the operation of a register in a group of registers to suppress further marking pulses generated by the marking pulse generator.

13. Apparatus according to claim 12 and in which each register comprises a gas discharge tube and the said means actuated by the operation of a register in a group of registers to suppress further marking pulses generated by the marking pulse generator comprises a resistor common to the anode circuits of all the gas-discharge tubes of a group of registers and a gate circuit which is operated by the fall of potential along the resistor when one gas-discharge tube conducts to suppress further marking pulses generated by the marking pulse generator.

14. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; register operating means to which the trains of pulses of the said circuits marked out of each group of circuits are applied, said operating means being responsive to one of the marking pulses applied to it to operate in a set of registers that combination of one register in each said group of registers indicating the circuit the train of marking pulses for which includes the said one of the marking pulses; and in which each register in a set of registers includes a gas-discharge tube and is provided with a gate circuit to which a source of registering pulses and the marking pulses are connected, the gate circuit operating on coincidence of a pulse from the source of registering pulses and a marking pulse to generate a pulse which is applied to the gas-discharge tube and initiates an electric discharge through the gas-discharge tube.

15. Apparatus according to claim 14 further comprising means by which the length of the pulse applied to the gas-discharge tube by the gate circuit is predetermined to at least equal the ionization time of the said tube.

16. Apparatus for selecting one of a number of circuits marked out of a group of circuits comprising means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; register operating means to which the trains of pulses of the said circuits marked out of each group of circuits are applied, said operating means being responsive to one of the marking pulses applied to it to operate in a set of registers that combination of one register in each said group of registers indicating the circuit the train of marking pulses for which includes the said one of the marking pulses; and in which the interval between successive marking pulses applied to a set of registers is made at least equal to the operating time of the registers by suppressing further marking pulses for a predetermined time after the application of a marking pulse to the set of registers.

17. Apparatus according to claim 16 in which the said means for suppressing marking pulses comprises a blocking oscillator pulse generator which receives marking pulses over its input circuit and has its output connected to means responsive to marking pulses and is arranged to block itself against the generation of a further pulse for a predetermined time after the generation of a pulse.

18. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of registers; register operating means to which the trains of pulses of the said circuits marked out of each group of circuits are applied, said operating means being responsive to one of the marking pulses applied to it to operate in the said marked set of registers that combination of one register in each said group of registers indicating the circuit the train of marking pulses for which includes the said one of the marking pulses; and in which each register in a set of registers includes a gas-discharge tube and the marking of a free set of registers comprises applying anode-cathode current supply to the gas discharge tubes of the set of registers.

19. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; register operating means to which the trains of pulses of the said circuits marked out of each group of circuits are applied, said operating means being responsive to one of the marking pulses applied to it to operate in a set of registers that combination of one register in each said group of registers indicating the circuit the train of marking pulses for which includes the said one of the marking pulses; and in which the said means for indicating a different circuit in said group of circuits by each combination of one register operated in each group of registers of each set of registers comprises for each of said circuits a gate circuit connected via a decoupling device to a register in each group of registers and arranged to operate when the registers to which it is connected are simultaneously operated.

20. Apparatus according to claim 19 in which the said gate circuit comprises an oscillator controlled to oscillate or not to oscillate and which oscillates when operated.

21. Apparatus according to claim 20 in which the output from the said oscillator when operated applies anode-cathode current to a set of registers each register comprising a gas-discharge tube.

22. Apparatus for selecting one of a number of circuits marked out of a group of circuits comprising: means for generating a time-spaced train of marking pulses for each of the circuits in the said group of circuits; at least one set of bi-stable registers, the registers of each set being arranged in at least one group, the number of combinations of one register operated in each group being at least equal to the number of circuits in the said group of circuits; means for indicating a different circuit in said group of circuits by each combination of one register operated in each group of registers of each said set of registers; means for marking a free set of registers; register operating means; means for applying to said register operating means the trains of pulses of the said circuits marked out of each group of circuits, said operating means being responsive to one of the marking pulses applied to it to operate in the said marked set of registers that combination of one register in each said group of registers indicating the circuit the train of marking pulses for which includes the said one of the marking pulses; in which the said means for indicating a different circuit in said group of circuits by each combination of one register operated in each group of registers of each set of registers comprises a common gate circuit and for each register a gate circuit individual to and connected to its register and arranged to communicate a train of registering pulses when its register is operated to said common gate circuit, said common gate circuit being common to all the gate circuits of a set of registers and combining the trains of registering pulses communicated to it into a selecting pulse which is coincident with the train of marking pulses said one of which operated the said combination of one register operated in each group of registers.

23. Apparatus according to claim 22 in which the said gate circuit comprises a rectifier.

24. Telephone exchange equipment including apparatus according to claim 22 in which the said group of circuits consists of telephone circuits which may be selectively called by calling circuits; said calling circuits being connected through further exchange apparatus to connector switches and each connector switch being connected to the said group of circuits and to one of said sets of registers; said calling circuit being adapted to convey a calling signal and called number signals designating a number of circuits in the said group of circuits to a free one of which is requires to be connected; the further exchange apparatus comprising means responsive to the called number signals for marking the said number of circuits out of the said group of circuits and for extending the calling signal as a forward hold signal to a connector switch and to the set of registers connected to the connector switch to mark said set of registers; said set of registers being responsive to a marking pulse and generating a selecting pulse which is communicated to the connector switch to indicate the selected one of said circuits and to a gate circuit which suppresses the marking pulses of the selected one of said circuits from the marking pulse generator.

25. Telephone exchange equipment including apparatus according to claim 22 in which the said group of circuits consists of telephone circuits adapted to convey calling signals, a calling signal over a circuit indicating that the circuit is to be connected to a free circuit connected to a connector switch which is also connected to the said group of circuits and to a said set of registers, a calling signal over a circuit also marking that circuit out of the group of circuits; further comprising means by which the condition free or engaged of each set of registering means is signalled to a line-finder selector apparatus which marks a free set of registers, said marked set of registers responding to a marking pulse and generating a selecting pulse, said selecting pulse being communicated to the connector switch to indicate the calling circuit to be connected and to a gate circuit which suppresses the marking pulses of the calling circuit from the marking pulse generator.

References Cited in the file of this patent

UNITED STATES PATENTS

| | | |
|---|---|---|
| 2,379,715 | Hubbard | July 3, 1945 |
| 2,512,676 | Ransom | June 27, 1950 |
| 2,541,932 | Melhose | Feb. 13, 1951 |
| 2,570,274 | Ransom | Oct. 9, 1951 |
| 2,582,959 | Bruce | Jan. 22, 1952 |
| 2,583,711 | Scowen | Jan. 29, 1952 |
| 2,619,548 | Lesti | Nov. 25, 1952 |
| 2,632,880 | Flowers | Mar. 24, 1953 |
| 2,638,505 | Van Mierlo et al. | May 12, 1953 |
| 2,666,809 | Flowers | Jan. 19, 1954 |